United States Patent [19]
Mori

[11] Patent Number: 4,580,162
[45] Date of Patent: Apr. 1, 1986

[54] ADAPTIVE PICTURE IMAGE COMPRESSION SYSTEM
[75] Inventor: Sumio Mori, Kanagawa, Japan
[73] Assignee: Fuji Photo Film Co., Ltd., Kanagawa, Japan
[21] Appl. No.: 553,206
[22] Filed: Nov. 18, 1983
[30] Foreign Application Priority Data
Nov. 19, 1982 [JP] Japan .................. 57-203444
[51] Int. Cl.$^4$ .............. H04N 11/04; H04N 7/12; H04N 1/40; H04N 1/417
[52] U.S. Cl. .................. 358/135; 358/260; 358/261; 358/138; 358/13
[58] Field of Search ............... 358/13, 133, 135, 138, 358/260, 261; 375/25; 371/37

[56] References Cited
U.S. PATENT DOCUMENTS 3,984,626 10/1976 Mounts et al. .................. 358/135
4,023,199 5/1977 Netravali et al. ................ 358/135
4,386,366 5/1983 Mori ............................... 358/260

Primary Examiner—Douglas W. Olms
Assistant Examiner—Wellington Chin
Attorney, Agent, or Firm—Sughrue, Mion, Zinn Macpeak & Seas

[57] ABSTRACT

An image compression system wherein the image is arranged in a block 1 of elements which are Hadamard transformed 2 and then quantized 3 into sequences. The DC component is prediction 4 into a DC error prediction term and all the sequences are then encoded 5 into a variable length code depending on the combination of the sequences. The variable length codes are written into a buffer memory 6 at an input bit rate and read therefrom at an output bit rate asynchronously with the writing. A counter 10 keeps track of the amount of unused space in the buffer memory and a quantization characteristic selector 9 uses this amount to determine the quantization level.

10 Claims, 17 Drawing Figures

FIG. 4

| Z.F. NO. | Z.F. $H_0$ $H_1$ $H_2$ | QUANTIZED VALUES $\Delta H_0$ $H_1$ $H_2$ | CODE LENGTH CL | BC | CODE |
|---|---|---|---|---|---|
| 1 | 0 | 0 0 0 | 8 | 0 0 | $S_x$ $X_5$ $X_4$ $X_3$ $X_2$ $X_1$ |
|   |   | ±1 0 0 | 8 | 0 1 | $S_x$ $X_5$ $X_4$ $X_3$ $X_2$ $X_1$ |
|   |   | h 0 0 | 9 | 1 0 | $S_x$ $X_5$ $X_4$ $X_3$ $X_2$ $X_1$ $X_0$ |
|   |   | h h 0 | 9 | 1 1 | $S_x$ $X_5$ $X_4$ $X_3$ $S_y$ $Y_3$ $S_z$ $Z_3$ $X_2$ $Y_2$ $Z_2$ $X_1$ $Y_1$ $Z_1$ $X_0$ $Y_0$ $Z_0$ |
| 2 | 2 2 | 0 0 0 | 2 | 0 0 | $S_x$ |
|   |   | ±1 0 0 | 3 | 0 1 | $S_x$ |
|   |   | h 0 0 | 8 | 1 0 | $S_x$ $X_5$ $X_4$ $X_3$ $X_2$ $X_1$ |
|   |   | h h 0 | 6 | 1 1 | $S_x$ $X_5$ $X_4$ $X_3$ $S_y$ $Y_3$ $S_z$ $Z_3$ $X_2$ $Y_2$ $Z_2$ $X_1$ $Y_1$ $Z_1$ |
| 3 | 3 3 | 0 0 0 | 2 | 0 0 | $S_x$ |
|   |   | ±1 0 0 | 3 | 0 1 | $S_x$ |
|   |   | h 0 0 | 7 | 1 0 | $S_x$ $X_5$ $X_4$ $X_3$ $X_2$ |
|   |   | h h h | 3 | 1 1 | $S_x$ $X_5$ $X_4$ $X_3$ $S_y$ $Y_3$ $S_z$ $Z_3$ $X_2$ $Y_2$ $Z_2$ |
| 4 | 4 4 | 0 0 0 | 2 | 0 0 | $S_x$ |
|   | 3 4 | ±1 0 0 | 3 | 0 1 | $S_x$ $X_5$ $X_4$ $X_3$ |
|   |   | h 0 0 | 6 | 1 0 | $S_x$ $X_5$ $X_4$ $X_3$ $S_y$ $Y_3$ $S_z$ $Z_3$ |
|   |   | h h h | 1 0 | 1 1 | $S_x$ $X_5$ $X_4$ $X_3$ $S_y$ $Y_3$ $S_z$ $Z_3$ |

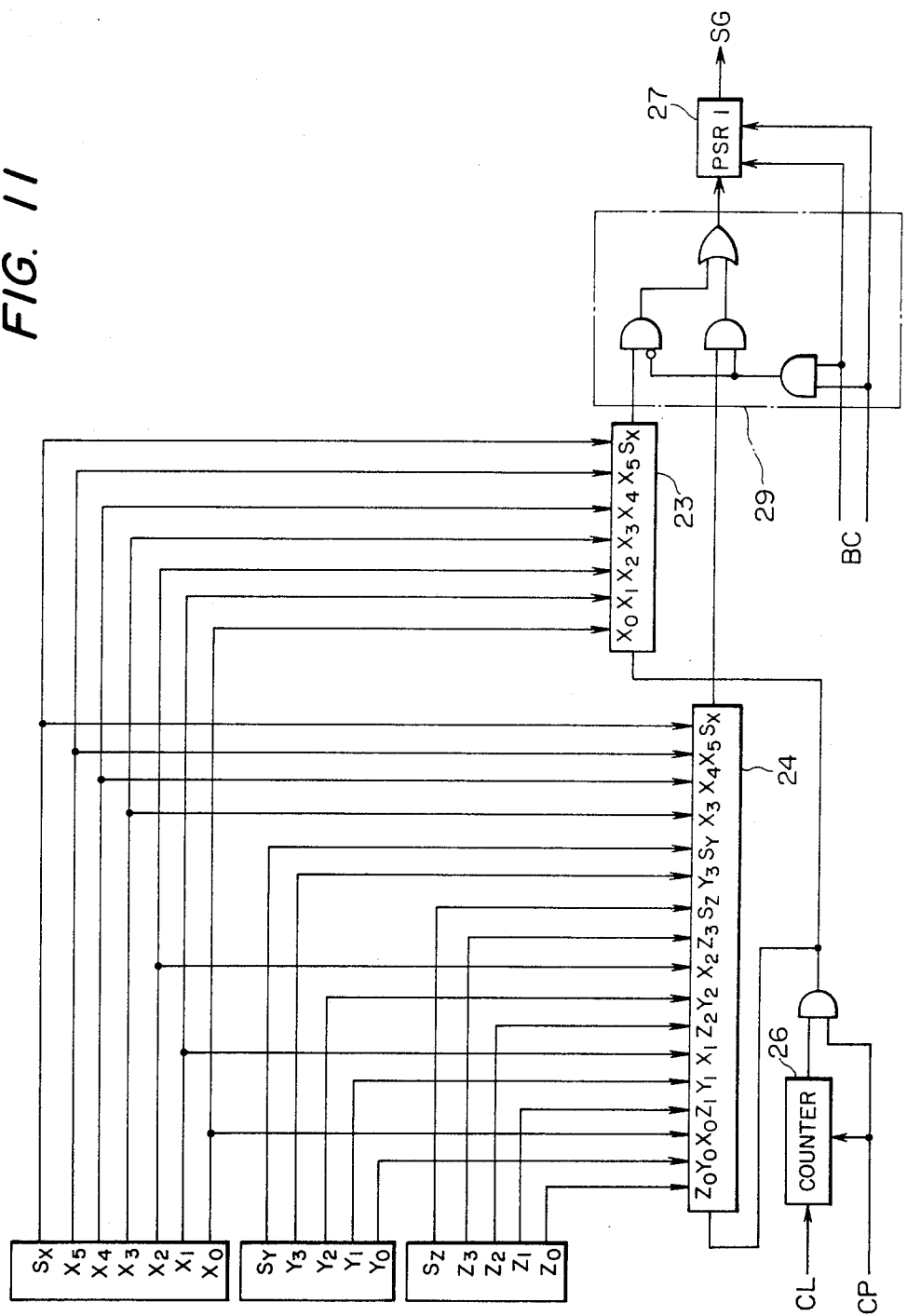

FIG. 12
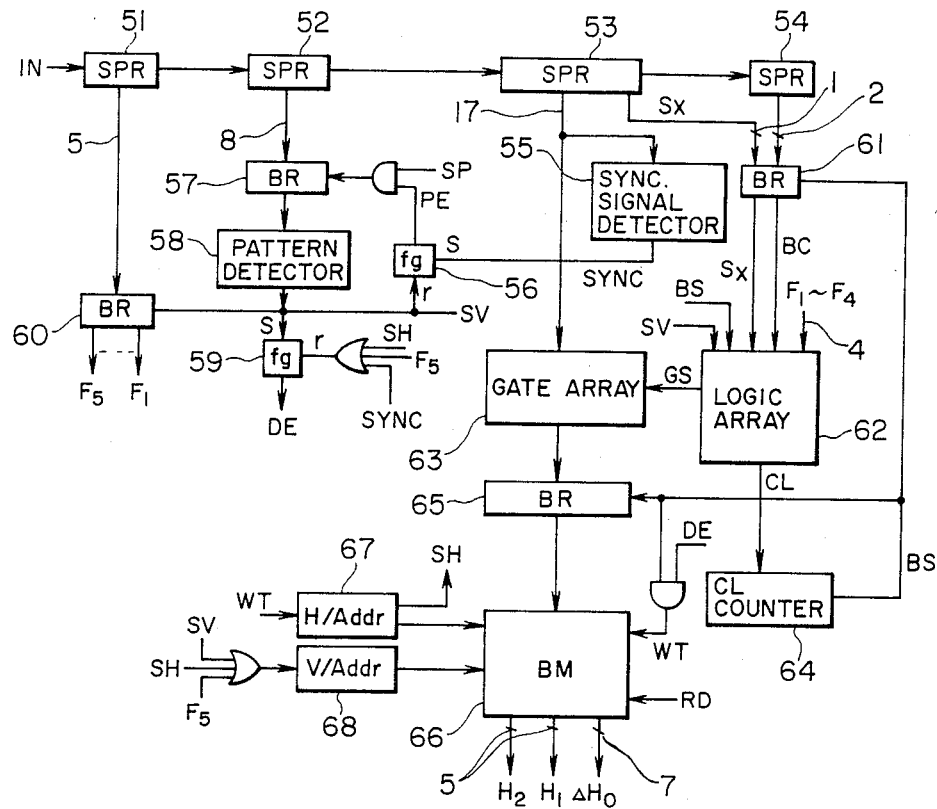
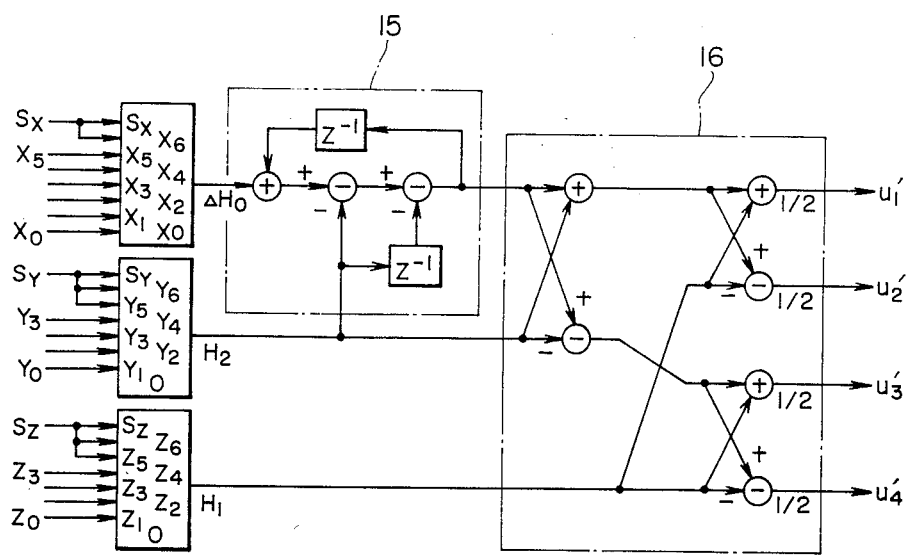

FIG. 16

| Z.F. NO | Z.F. H0 H1 H2 H3 | QUANTIZED VALUE ΔH0 H1 H2 H3 | CODE LENGTH CL | BC | CODE |
|---|---|---|---|---|---|
| 1 | 0 — — — | 0 0 0 0 | 8 | 0 0 | Sx X5 X4 X3 X2 X1 |
|   |   | ±1 0 0 0 | 8 | 0 1 | Sx X5 X4 X3 X2 X1 |
|   |   | h 0 0 0 | 9 | 1 0 | Sx X5 X4 X3 X2 X1 X0 |
|   |   | h h h h | 4 | 1 1 | Sx X5 X4 X3 Sy Y3 Sz Z3 Sw W3 X2 Y2 Z2 W2 X1 Y1 Z1 W1 X0 Y0 Z0 W0 |
| 2 | 1 1 — — | 0 0 0 0 | 2 | 0 0 | — |
|   |   | ±1 0 0 0 | 3 | 0 1 | Sx |
|   |   | h 0 0 0 | 8 | 1 0 | Sx X5 X4 X3 X2 X1 |
|   |   | h h h h | 9 2 | 1 1 | Sx X5 X4 X3 Sy Y3 Sz Z3 Sw W3 X2 Y2 Z2 W2 X1 Y1 Z1 W1 |
| 3 | 2 2 2 — | 0 0 0 0 | 2 | 0 0 | — |
|   |   | ±1 0 0 0 | 3 | 0 1 | Sx |
|   |   | h 0 0 0 | 7 | 1 0 | Sx X5 X4 X3 X2 |
|   |   | h h h h | 6 | 1 1 | Sx X5 X4 X3 Sy Y3 Sz Z3 Sw W3 X2 Y2 Z2 W2 |
| 4 | 3 3 3 3 | 0 0 0 0 | 2 | 0 0 | — |
|   |   | ±1 0 0 0 | 3 | 0 1 | Sx |
|   |   | h 0 0 0 | 6 | 1 0 | Sx X5 X4 X3 |
|   |   | h h h h | 2 | 1 1 | Sx X5 X4 X3 Sx Y3 Sz Z3 Sw W3 |

ADAPTIVE PICTURE IMAGE COMPRESSION SYSTEM

BACKGROUND OF THE INVENTION

The present invention relates to a picture image compression system in which, in coding for the purpose of narrow band transmission or storage of picture images, a variable length code is adaptively provided, depending on the combination of respective sequences converted into the spatial frequency domain, through Hadamard transformation.

It is well know that it is possible to achieve a reduction in transmission requirements or to bandwidth compress signals by deleting redundant signals in view of the statistical characteristic of a picture image or by deleting signals unnecessary for an acceptable visual characteristic.

High efficiency coding can be achieved if a bias can be applied to a picture image in any picture image transformation by using the fact that picture image signals have a strong spatial correlation between adjoining picture elements. A linear prediction transformation system and an orthogonal transformation system are well known as a transformation system for providing a bias to a picture image. The linear prediction transformation system utilizes the fact that when adjoining picture elements are predicted, the prediction error has a statistical deviation, while the orthogonal transformation system utilizes the fact that when a picture image is transformed into the spatial frequency domain, there is a deviation in the spectra of the respective frequency components which are the output of the transformation. In order to perform effective coding, it is preferable to allow distortion to a visually allowable degree or to allow quantization distortion in these transformation components in order to reduce the amount of transmitted information. Furthermore, since the entropy becomes small when there is a deviation in the probability distribution of these transformation components, it is preferable to give a variable length code adaptive to this effect. The statistical deviation varies considerably depending on the picture image and has such a characteristic that the deviation is large in the case of a smooth picture image, while the dispersion is large in the case of a complex picture image. As a result in variable length coding, the compressibility or the amount of information in a compressed picture image varies widely depending on the picture image. This means that when the input of picture image as well as the output rate are constant, the application of variable length code to the picture image produces a variation in time base with respect to the amount of transmitted information. Accordingly, it is required to correct the variations in time base.

SUMMARY OF THE INVENTION

An object of the present invention is to provide, particularly in view of the above-mentioned effect, a picture image compression system in which variable length coding is efficiently provided and adaptive coding is performed so as to suppress the deviations in compressibility in accordance with the output bit rate.

In a basic system according to the present invention, Hadamard transformation is employed as means for transforming a picture image into the spatial frequency domain and for thus obtaining spatial frequency components which are then further subject to the linear prediction transformation.

BRIEF DESCRIPTION OF THE DRAWINGS

FIG. 4 is a diagram illustrating the configuration of the variable length code provided in accordance with the combination of a plurality of quantization levels and quantized values of the respective sequences;

FIG. 11 is a diagram of the bit arrangement of the transmission information in FIG. 5;

FIG. 12 is a diagram of a particular circuit configuration of the picture image reproducing means as shown in FIG. 3(b);

FIG. 16 is a diagram illustrating the construction of the variable length code provided in accordance with the combination of a plurality of quantization levels and quantized values of the respective sequences.

DETAILED DESCRIPTION OF THE INVENTION

Figure 1:
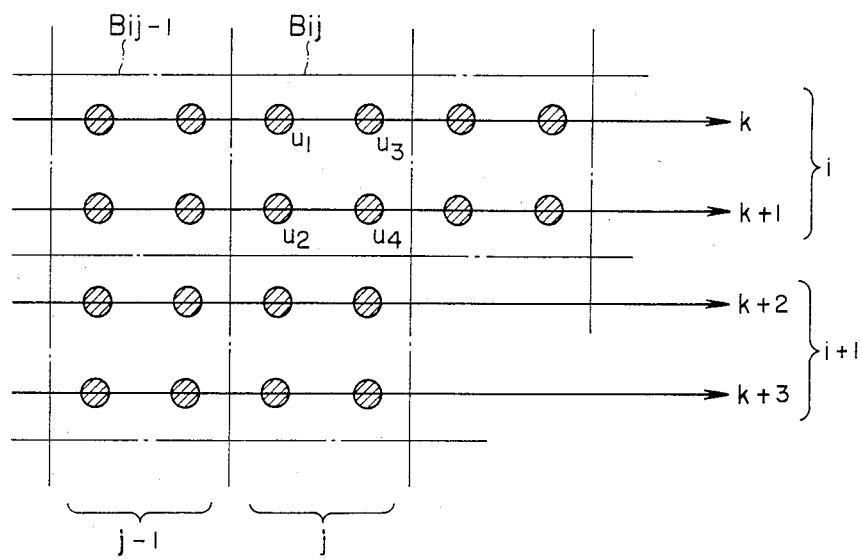
FIG. 1 shows an original picture image which has been divided into blocks each including 2×2 picture elements adjacent to each other.

In Hadamard transformation, the transformation matrix is composed of a multiplicity of elements "1" and "−1" and the transformation has an advantage that the circuit for transformation can be simply constituted by using only adders and subtractors.

The respective sequences converted into the frequency domain through Hadamard transformation correspond to the frequency axes in Fourier transformation, so that the zero degree and high degree sequences can be considered as the parameters representing the amount of DC component and the amounts of the corresponding high frequency components, respectively. For this, if the correlation between the original picture elements is strong, the signal energy after Hadamard transformation is concentrated into the low degree sequences. In an ordinary picture image, the energy in the high frequency component is small, and it is possible to decrease the number of bits of the quantization level in the respective sequence to a visually allowable degree. Further, the Hadamard transformation coding system for the purpose of bandwidth compression is particularly effective for low bit-rate coding, and it is possible to disperse the deterioration in picture quality due to the quantization so as to not be visually distractive. That is, there is an advantage that the quantization can be easily performed in accordance with the spatial frequency on the basis of the visual characteristic that the quantization noise at a smooth portion of the picture image is apt to attract attention, while the noise at a portion at which a steep change exists hardly attracts attention.

The respective sequences obtained by Hadamard transformation reduce the amount of information by distributing proper quantization levels in accordance with the respective spectra. This is accomplished by giving distortion to a visually allowable extent to the respective spectra, so that the less the amount of spectra, the fewer the number of bits of the quantization levels to be distributed. In an ordinary picture image, however, the correlation between the adjoining picture elements is strong and therefore it is observed that the energy of the low degree component is high, while that of the high degree component is low. Accordingly, if there is any transformation means for reducing the energy of the low degree component, the number of bits to be distributed can be thereby decreased, A system is known for such a transformation in which the respective sequences obtained by Hadamard transformation are linearly prediction transformed.

An example of such a linear prediction transformation system will be described hereunder. For the sake of simplicity of explanation, description will be made for a case where the block size of Hadamard transformation is set as 2×2, and the original picture image is divided into the blocks shown in FIG. 1. The scanning line number of the original picture image is designated by k, k+1, ... and the block line number is designated by i, i+1, ..., where one block line is defined as one set of plural blocks included in two scanning lines. If two horizontally arranged picture elements are assumed to be one set and the respective sets are designated by j, j+1..., the original picture image can be grouped into blocks $B_{ij-1}$, $B_{ij}$, ..., each block having a 2×2 size. Assuming now that the picture elements included in the block $B_{ij}$ are designated as ($u_1$, $u_2$, $u_3$, $u_4$) as shown in the arrangement shown in FIG. 1, the normalized Hadamard transformation can be expressed by the following Equation (1) by using a quadratic or quartic Hadamard matrix:

$$\frac{1}{2}\begin{pmatrix} 1 & 1 \\ 1 & -1 \end{pmatrix} \cdot \begin{pmatrix} u_1 & u_2 \\ u_3 & u_4 \end{pmatrix} \begin{pmatrix} 1 & 1 \\ 1 & -1 \end{pmatrix} = \quad (1)$$

$$\frac{1}{2}\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} u_1 \\ u_2 \\ u_3 \\ u_4 \end{pmatrix} = \begin{pmatrix} H_0 \\ H_1 \\ H_2 \\ H_3 \end{pmatrix}$$

where the sequences $H_0$, $H_1$, $H_2$ and $H_3$ correspond to quartic frequency components which are transformed into the frequency domain by Hadamard transformation and represent respectively a DC component, a vertical component, a horizontal component and a gradient component. The scanning line k and k+1 in the row i of the block $B_{ij}$ may be simultaneously scanned so as to sequentially read out the sets of picture elements ($u_1$, $u_2$) and ($u_3$, $u_4$) in this order. Alternatively, the scanning line k may be first scanned so as to store the elements ($u_1$, $u_3$) sequentially in this order so that the picture elements ($u_1$, $u_2$) and ($u_3$, $u_4$) are read out when the scanning line k+1 is scanned. Assuming that the sequences of the present block $B_{ij}$ are ($H_0$, $H_1$, $H_2$, $H_3$) and those of the previous block $B_{ij-1}$ are ($H_0'$, $H_1'$, $H_2'$, $H_3'$), that Hadamard transformation is effected in the horizontal direction according to FIG. 1. The thus obtained respective sequences are linearly predicted also in the horizontal direction.

If the sequences $H_0$ and $H_1$ of the block $B_{ij}$ are predicted in accordance with the following Equation (2), the prediction error components are those which give the shortest distances between the respective picture elements between blocks. Also, when the correlation between picture elements is strong, the energy of these prediction error components can be reduced. This is because when the correlation between picture elements is strong, the values of the prediction error components converge in the direction to be zero.

$$\hat{H}_0 = H_0' - H_2' - H_2 \quad (2)$$
$$\hat{H}_1 = H_1' - H_3' - H_3$$
$$\Delta H_0 = H_0 - \hat{H}_0 = H_0 - H_0' + H_2' + H_2$$
$$\Delta H_1 = H_1 - \hat{H}_1 = H_1 - H_1' + H_3' + H_3$$

In Equation (2), $\hat{H}_0$ and $\hat{H}_1$ represent the prediction values for the sequences $H_0$ and $H_1$ respectively, and $\Delta H_0$ and $\Delta H_1$ represent the values of the prediction difference transformation or the prediction error components.

Thus, the sequences $H_0$ and $H_1$ of the present block $B_{ij}$ are predicted on the basis of the respective sequences $H_0'$, $H_1'$, $H_2'$ and $H_3'$ of the previous block $B_{ij-1}$ is the same block line so as to obtain the prediction error components $\Delta H_0$ and $\Delta H_1$. Accordingly, it is efficient to transmit the DC prediction error component $\Delta H_0$, the vertical prediction error component $\Delta H_1$, the horizontal component $H_2$ and the gradient component $H_3$.

Figure 2:
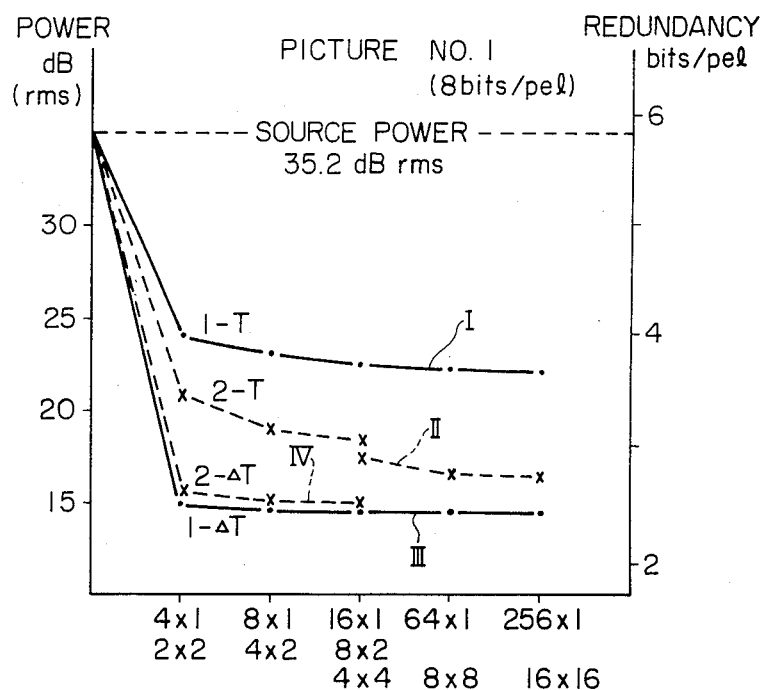
FIG. 2 is a graph showing the result of measurement of the relation among the transmission energy, the number of picture elements, and the block size of Hadamard transformation.

FIG. 2 shows the effect in saving of energy to be transmitted for the case where the respective sequences obtained by Hadamard transformation are prediction.

If the dispersion of a picture image u in accordance with the Gaussian distribution with no memory is represented by $\sigma^2 u$, the dispersion of the respective sequence v by $\sigma^2 v$, the dispersion of the sequence subjected to linear prediction by $\sigma^2 \Delta v$, and the block size of Hadamard transformation by N, then the absolute value Pa or Ra of the energy to be transmitted is expressed by the following Equation (3) or (4) based on rate distortion theory.

$$Pa = \frac{10}{N} \sum_{v=0}^{N-1} \log_{10} \sigma^2 v \quad (3)$$

$$Ra = \frac{10}{N} \sum_{\Delta v=0}^{N-1} \log_{10} \sigma^2 \Delta v \quad (4)$$

Accordingly, the relative value Pr of the energy to be transmitted is as follows:

$$Pr = 10 \log_{10} \sigma^2 - Pa \tag{5}$$

FIG. 2 shows the absolute value of the energy to be transmitted versus the picture elements in a standard picture image having 8 bits/picture-element obtained by the above-mentioned Equations (3), (4) and (5). In FIG. 2, the characteristics I and II show the variations in the absolute energy of the entire sequences of the first degree and second degree Hadamard transformations, respectively, and the characteristics III and IV show the variations in the absolute energy of the entire sequences when the characteristics I and II are horizontally Hadamard transformed and then vertically linear-predicted respectively, with respect to various block sizes. The total energy of the original picture image is 35.2 dB (r.m.s). As will be apparent from this, the energy to be transmitted is remarkably reduced in the characteristics III and IV in comparison with the characteristics I and II. Further, in each of the characteristics I and II, the energy to be transmitted is substantially constant independent of the block size. From the viewpoint of the energy to be transmitted, this means that it is more efficient to effect linear predicting with the block size selected to be $4 \times 1$ or $2 \times 2$, than the case where the block size is selected to be larger which makes the circuit more complex. The drawing shows that the relative value Pr of the energy to be transmitted is 20 dB ($=35$ dB$-15$ dB) so that the energy to the transmitted can be reduced by 20 dB even in the case where the block size is selected to be $4 \times 1$ or $2 \times 2$.

As seen from Equation (1), since the vertical component $H_1$ is already composed of the sum and difference in the block $B_{ij}$ and the energy to be transmitted is very small in comparison with the DC component $H_0$, linear predicting will produce little effect even if it is performed. That is, since there is no significant difference in magnitude of the energy to be transmitted between the vertical component $H_1$ and its prediction error component $\Delta H_1$, the linear prediction is performed only with respect to the DC component $H_0$, and the components $\Delta H_0$, $H_1$, $H_2$ and $H_3$ are selected as the sequences to be transmitted.

In this manner, conventionally, appropriate quantized levels are assigned to these sequences $\Delta H_0$, $H_1$, $H_2$ and $H_3$ and the distribution of the number of bits is calculated in order to perform coding. This quantization allows distortion D in the respective frequency component v to a degree so as not to produce visual deterioration in the spatial power spectra of picture image. The amount R of information required for transmission at this time is given by the following Equation (6) based on rate distortion theory:

$$R \text{ [bit/picture-element]} = \frac{1}{2N} \sum_{v=0}^{N-1} \text{Max}\left(0, \log_2 \frac{\sigma^2_v}{D}\right) \tag{6}$$

For example, if 6 bits, 4 bits, 4 bits and 2 bits are distributed to the sequences $\Delta H_0$, $H_1$, $H_2$ and $H_3$, respectively, 16 bits are to be transmitted in the total transmission for one block (4 bits/picture-element). If it is necessary to further compress, the distortion D is made larger as is apparent from Equation (6), which results in degradation in the quality of the reproduced picture image.

The present invention is intended to improve the compressibility to a large extent without increasing the distortion D more than in the above-mentioned method.

Contrary to the conventional case where the quantized values of the respective sequences $\Delta H_0$, $H_1$, $H_2$ and $H_3$ are separately transmitted, according to the present invention, the quantized values of the above-mentioned sequences $\Delta H_0$, $H_1$, $H_2$ and $H_3$ are arranged in combinations and variable length codes are given to the combinations. That is, the coding is effected in such a manner that, for example, (1) when the quantized values of the respective sequences $\Delta H_0$, $H_1$, $H_2$ and $H_3$ are $\Delta H_0 = H_1 = H_2 = H_3 = 0$ (38% of the time), only the code of this combination is transmitted, (2) when they are $\Delta H_0 = \pm 1$ and $H_1 = H_2 = H_3 = 0$ (29% of the time), only the code of this combination and the negative or positive sign of the sequence $\Delta H_0$ are transmitted, (3) when they are $\Delta H_0 \neq 0$, $\pm 1$ and $H_1 = H_2 = H_3 = 0$ (25% of the time), only the code of this combination and the quantized value of the sequence $\Delta H_0$ are transmitted, and (4) in the case of other conditions (8% of the time), the code of this combination and the respective quantized values of all the sequences $\Delta H_0$, $H_1$, $H_2$ and $H_3$ are transmitted.

This is because, in comparison with the DC prediction error component $\Delta H_0$, the respective quantized values of the other components are very small with a high probability that they are zero, and because when the respective sequences are quantized to the degree so as not to produce visual deterioration in a standard picture image, such probabilities of combination occurrence as quoted above have been obtained.

Thus, it is very efficient to use variable length codes depending on the combinations of sequences in one block, and this is one of the features of the present invention. However, the compressibility of one block may be different from the other and there arises such a disadvantage as described above. In this case, therefore, it is necessary to provide a buffer memory having a sufficient capacity for absorbing the difference between the coding bit rate and the transmitting bit rate. That is, it is necessary to correct the variations in time base. In oridinary picture images, the compressibility may vary such that a large compressed image becomes two to four times as large as a small compressed image depending on the kind of picture image and therefore a large capacity buffer is required. In order to make it possible for a small capacity buffer to effectively absorb the variations in compressibility and to reduce the size of the circuit, in the present invention a device has been made such that the quantization characteristics are successively selected for the respective sequences in accordance with the output bit rate. As a result, a small capacity buffer can adequately absorb the difference between the input and output bit rates. That is, in view of the fact that the correlation is usually strong between adjacent lines in a picture image and therefore the variation in compressibility in line will be gradual, the quantization characteristic for the respective sequences for the next block line is adaptively selected in accordance with the available space in the buffer memory.

Referring to the drawings, an embodiment of the present invention will now be described. For the sake of simplicity of explanation, although the description is made with respect to an embodiment employing Hadamard transformation with the block size $2 \times 2$, the block size is not limited to this value according to the present invention.

Figure 3:
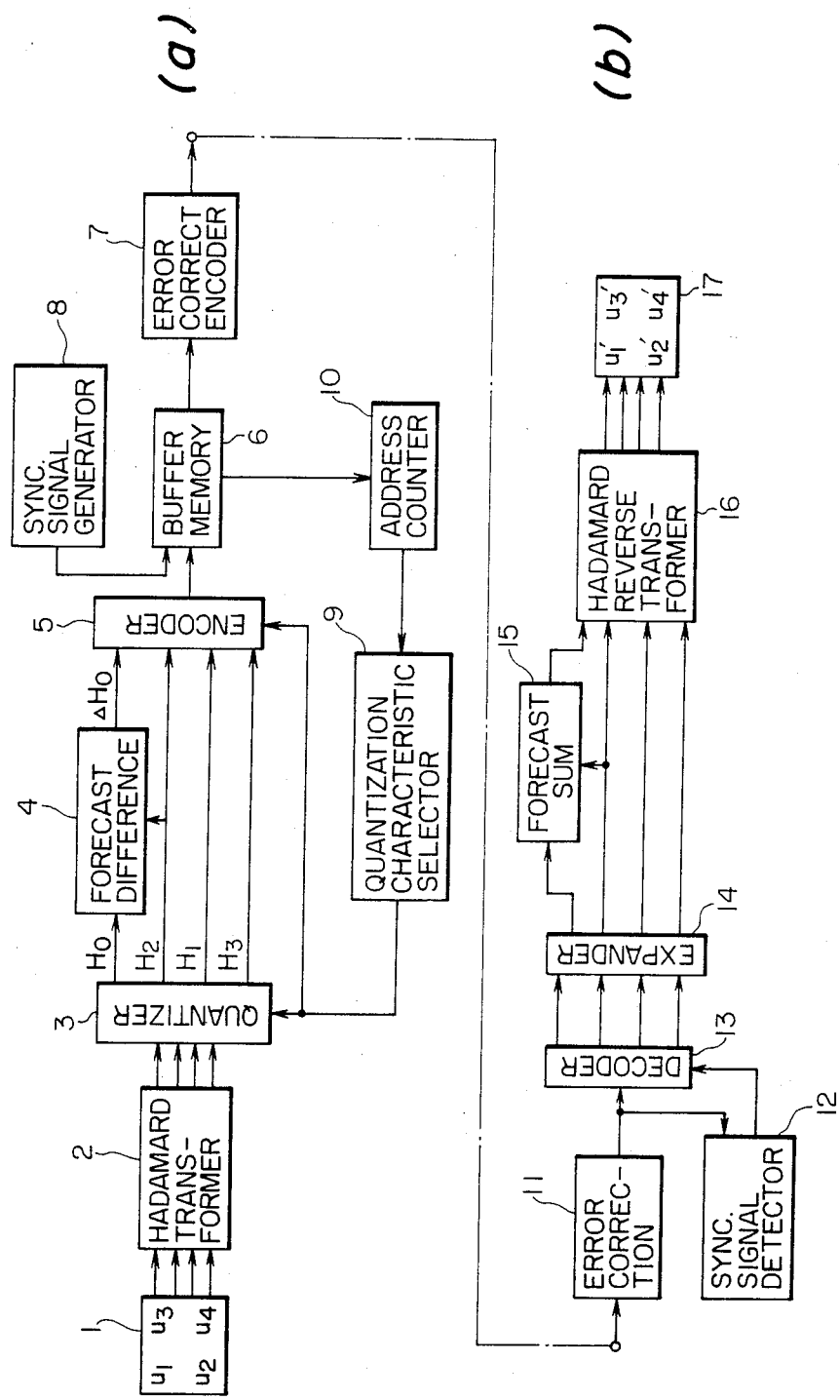
FIG. 3 is a block diagram illustrating a picture image compressing device (a) and a picture image reproducing device (b) for explaining the present invention.

FIG. 3 is a block diagram for explaining an example of the whole arrangement according to the present invention. In FIG. 3, section (a) shows a picture image compressing device, and section (b) shows a picture image reproducing device.

Reference numeral 1 designates an input picture element group ($u_1$, $u_2$, $u_3$, $u_4$) of the block $B_{ij}$ of FIG. 1. A Hadamard transformer 2 calculates the four sequences, namely, the DC component $H_0$, the vertical component $H_1$, the horizontal component $H_2$, and the gradient component $H_3$, from the input picture element group 1 on the basis of Equation (1), A quantizer 3 quantizes the respective sequences $H_0$, $H_1$, $H_2$ and $H_3$ by using a quantization characteristic selector 9. Here, at the most, only the DC component $H_0$ is converted into a DC prediction error component $\Delta H_0$ by a prediction difference converter 4 on the basis of Equation (2). The thus obtained quantized sequences $\Delta H_0$, $H_1$, $H_2$ and $H_3$ are coded to a variable length by an encoder 5. The variable length has a format determined for each quantization characteristic depending on the combination of the quantization values as shown in FIG. 4 (the gradient component $H_3$ is disregarded in FIG. 4 for reasons which will be described later). The entries of FIG. 4 will also be described in detail later. The variable length codes compressed by the encoder 5 are successively inputted into a buffer memory 6 shown in FIG. 3 and, simultaneously, in the case of real time processing, read out of the buffer memory 6 at a predetermined bit rate asynchronously with respect to the input to the buffer. Then a correction encoder 7 adds redundancy codes to the read-out variable length codes for correcting errors generated on a transmission line.

Upon the completion of one block line of picture image, a synchronizing signal is inputted to the buffer memory 6 from a synchronizing signal generating circuit 8.

The quantization characteristic selector 9 has the number $P-1$ of address pointers which divide the address space of the buffer memory 6 into P portions. For example, the buffer memory 6 has a capacity of 512 bits and the quantization characteristic selector 9 has seven address pointers $L_1 = P_1$, $L_2 = 128$, $L_3 = 192$, . . . $L_7 = 448$ which divide the address space of the buffer memory 6 into eight portions. An address counter 10 increments by one every time a fixed number of bits of the varible length code is inputted into the buffer memory, for example, every 8 bits (1 byte), while it decrements by one every time 8 bits of variable length code are outputted from the buffer memory 6 at a predetermined bit rate. The address counter 10 thus keeps track of the boundary of the buffer memory 6, above which the memory is currently unused. It also sends, upon the completion of the above-mentioned operation for one block line of the input picture image, the unused space boundary of the buffer memory 6 at that time to the quantization characteristic selector 9. At this time, the quantization characteristic selector 9 judges in which range of the address pointer $L_n$ the boundary of the unused space of the buffer memory 6 lies, properly selects a quantization characteristic for the next block line, and sends the selected quantization characteristic to the quantizer 3.

To avoid a possible risk of underflow in the buffer memory, in the present embodiment, the first address pointer $P_1$ is selected to be equal to the product (output bit rate) × (total number of picture elements in one block line). However, the present invention is not restricted to this choice.

Thus, the variations in coding bit rate to the buffer memory 6 can be smoothed to enable use of a small capacity buffer memory even if the variations are extreme and the buffer memory can produce its output at a stable and constant bit rate. That is, in the control performed at this point, the quantization characteristic is selected such that when the dead or unused area of the buffer memory 6 becomes so large that there arises a risk of underflow, the quantization for the respective sequence for the next block line is made finer, while when the dead area of the buffer memory 6 becomes so small that there arises a possibility of overflow, the quantization for the respective sequence for the next block line is made coarser.

Although the control to make the quantization coarser may result in degradation in S/N ratio, the fact that the coding bit rate is high in comparison with the output bit rate means that the picture construction of that block line has been complicated and therefore the deterioration in S/N ratio is not so visually noticeable even though the quantization is made coarse to a certain degree at this time. However, the output bit rate may be a standard for the planned picture quality value of the reproduced image. If the coding bit rate is lowered when it is higher than the output bit rate designed as a standard for given picture quality, it is natural that the reproduced picture quality becomes inferior to the preset one. It should be noted here that the above-mentioned control is performed in such a direction that the deterioration in visual picture quality is not markedly affected.

On the contrary, the fact that the coding bit rate is lower than the output bit rate means that the picture image construction of that block line has been smooth and therefore at this time the quantization is made finer because the deterioration is apt to visually attract attention and there is a risk of underflow of the buffer memory.

As discussed above, the variations in the coding bit rate are smoothed by adaptively changing the quantization characteristic. The visual characteristic is preset with the output bit rate as a picture quality standard for the reproduced picture image, that is, the average output length per input picture element, so that the transmission can be effected at a predetermined output rate while using a small capacity buffer memory.

The variable length code read out of the buffer memory 6 is transmitted at a predetermined output rate. Generally, in order to maximize reliability in transmission of information on a low reliability transmission line when the information is transmitted, it is required to provide redundancy for the information. Particularly, the information subjected to bandwidth compression has, as a result, little redundancy and is apt to suffer the influence of errors generated on the transmission line. Accordingly, it is necessary to add a redundancy code appropriate to the error characteristic of the transmission line to the transmitted picture information to thereby improve the reliability of the transmission line. This is nothing but an error correction technique, and various systems are known in coding theory. In magnetic recording, as an example of a transmission line, random errors as well as burst errors increase as the recording density increases and therefore it becomes necessary to provide an error correction coding system appropriate to the above-mentioned tendency. Generally, it becomes difficult to effect correction as the burst error lengthens, and therefore an interleaving has been proposed in which the burst error is rearranged so as to be shortened or to be made to appear as a random error. For such error correction, various systems have been established. For example, chain-like codes are often used such that the random error and short burst error are corrected by inner codes, while the other errors are corrected by outer codes. As such inner and outer codes, a cyclic code, a fire code, a BCH code, a Reed Solomon code, an adjacent code, or the like are often used to correct or detect errors.

For whatever method is used, it is necessary to use efficient error correction or error compensation within a range in which visual deterioration due to errors based on the error characteristic of the transmission line is allowed.

Thus, the compressed picture image signal is received by the picture image reproducing device as shown in FIG. 3(b) through a transmission line, for example, a magnetic recording system. With respect to the received signal, in many cases, errors generated on the transmission line are corrected in a correction circuit 11. A synchronizing signal detector 12 detects a synchronizing signal out of a group of signals inputted at a predetermined bit rate. Signals disposed between the thus detected synchronizing signal and a next synchronizing signal to be detected are considered as a compressed picture image signal and transferred to a decoder 13.

The decoder 13 serves to decode the variable length codes which have been coded by the encoder 5 so as to obtain fixed length quantized values of the respective sequences $\Delta H_0$, $H_1$, $H_2$ and $H_3$ in accordance with the quantization characteristics of FIG. 4. An expander 14 serves to expand and to thus restore the respective sequences $\Delta H_0$, $H_1$, $H_2$ and $H_3$ which have been quantized by the quantizer 3 and thus variable-length compressed by the encoder 5. A prediction sum converter 15 serves to restore the DC component $H_0$ by using the relation $H_0 = \Delta H_0 + H_0' - H_2' - H_2$ from Equation (2). The thus restored respective sequences $\Delta H_0$, $H_1$, $H_2$ and $H_3$ are inputted to a Hadamard reverse-transformer 16 and a group of reproduced picture elements 17 ($u_1'$, $u_2'$, $u_3'$, $u_4'$) of the block $B_{ij}$ are obtained in accordance with Equation (8) as will be shown later.

The amount of noise carried by the thus obtained reproducing picture image of one frame can be expressed in the form of energy as follows:

$$10 \log_{10} \{\Sigma(u_1 - u'_1)^2/N\} \text{dB} \tag{7}$$

This amount of noise provides a standard for deterioration in picture quality due to errors or the like generated in quantization and/or on the transmission line.

FIG. 4 shows the quantization characteristics to be selected depending on the unused space of the buffer memory 6 and the construction of variable length codes to be used at that time. In FIG. 4, "Z.F.No." represents the zonal filtering number, that is, the number for the quantization characteristics to be adaptively selected and "Z.F." represents the zonal filtering levels, that is, the amount of distortion to be allowed for the respective sequences $H_0$, $H_1$ and $H_2$. For example, with respect to Z.F. No. 2, Z.F. (1, 2, 2) means that zeroes are assumed for the lowermost 1 bit, 2 bits and 2 bits of the respective values of the DC component $H_0$, the vertical component $H_1$ and the horizontal component $H_2$ to thereby perform linear quantization. The bits of inserted zeroes are the respective allowable distortion amounts. The DC component $H_0$ is converted into the prediction error component $\Delta H_0$ to which a proper variable length code is then assigned depending on the combination of the quantization values of the respective sequences $\Delta H_0$, $H_1$, and $H_2$. The possible combinations are (0, 0, 0), ($\pm 1$, 0, 0), (h, 0, 0) or (h, h, h), as described above.

Here, "h" designates a value other than 0 and $\pm 1$ for the sequence $\Delta H_0$, and a value other than 0 for the sequences besides $\Delta H_0$. In FIG. 4, "CODE LENGTH" represents the length of code when the variable length coding is provided in accordance with the quantization characteristic and the combination of the quantization values. The designation "CODE" represents the formats when the respective sequences $\Delta H_0$, $H_1$, and $H_2$ are transmitted. In the column of "CODE," X, Y and Z designate, respectively, the DC prediction error component $\Delta H_0$, the horizontal component $H_2$ and the vertical component $H_1$, and the subscript attached to X, Y and Z represents the bit position of that value. The bit S designates the positive or negative sign of the respective value. Further in FIG. 4, "BC" represents block codes which indicates the combinations of the respective sequences, that is, which variable length code has been used is determined by the block code "BC". In FIG. 4, the gradient $H_3$ is omitted for the reason to be described later.

Figure 5:
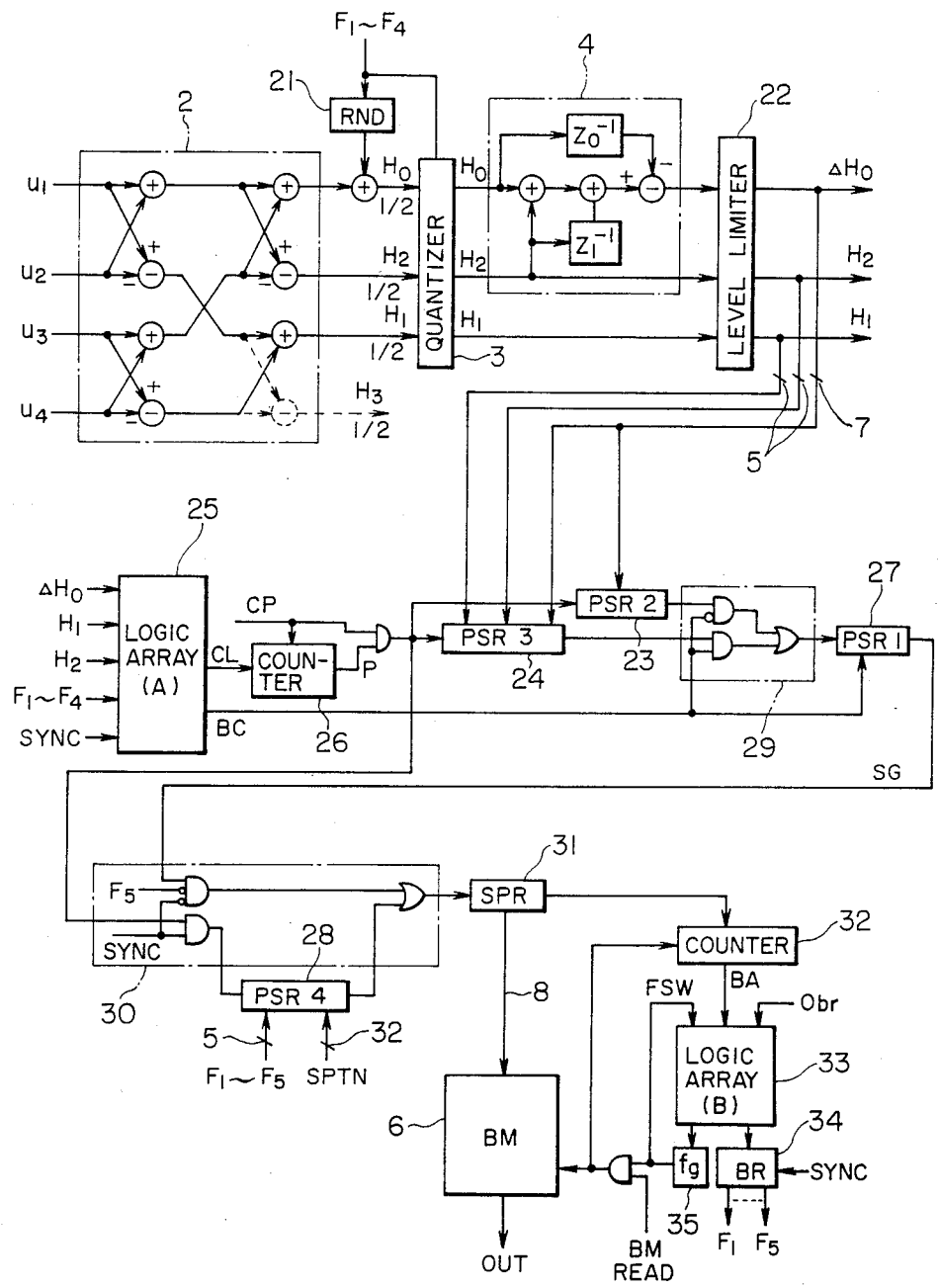
FIG. 5 is a diagram of a particular circuit configuration of the picture image compressing device as shown in FIG. 3(a)

FIG. 5 shows an embodiment more particularly illustrating the picture image compression device. The picture elements ($u_1$, $u_2$, $u_3$, $u_4$) extracted from the $2 \times 2$ window space of an original picture inage as shown in FIG. 1 are calculated according to Equation (1) through the Hadamard transformer 2 constituted by adder/subtractor means so as to obtain the DC component $H_0$, the vertical component $H_1$ and the horizontal component $H_2$, of the four sequences $H_0$ to $H_3$.

The reasons why the gradient component $H_3$ is omitted are as follows. First, generally, the energy of the gradient component $H_3$ is small in comparison with other components in an ordinary picture image. Secondly, although the gradient component $H_3$ is thereby distorted with the result that the picture image having oblique patterns may be degraded, nonetheless the deterioration in the oblique patterns relative to the whole picture image barely attracts any visual attention in the case where the block size of Hadamard transformation is directed to a very small space. Such is the case in the present embodiment in which the block size is assumed to be $2 \times 2$. This is particularly true if the distortion of the DC component $H_0$ in such a small space is small.

Here, only the DC component $H_0$ is subject to round-off corresponding to the quantization characteristic. For example, if the quantization level used for the present block line is 3, a register 21 is set to (0111) as a filter signal ($F_4$, $F_3$, $F_2$, $F_1$) and therefore "8" is added to the DC component $H_0$ and then halved for the normalization of Hadamard transformation. It is possible to experimentally confirm the fact that the improvement in accuracy by rounding at least the DC component $H_0$ is effective in reducing quantization noise on the previously obtained reproduced picture image without increasing entropy. Although the quantization noise can be reduced by subjecting the other sequences $H_1$ and $H_2$ to such a rounding operation, entropy may be greatly increased in this case unlike the case of the DC component, especially in a complicated picture image, and therefore the rounding operation for the other sequences $H_1$ and $H_2$ is omitted here. This is because the sequences $H_1$ and $H_2$ are already formed by the sum and difference in the block $B_{ij}$ so that the levels thereof converge to zero and there exist a large probability that the levels of the sequences will be more widely dispersed by the rounding operation of the sequences $H_1$ and $H_2$.

Figure 6:
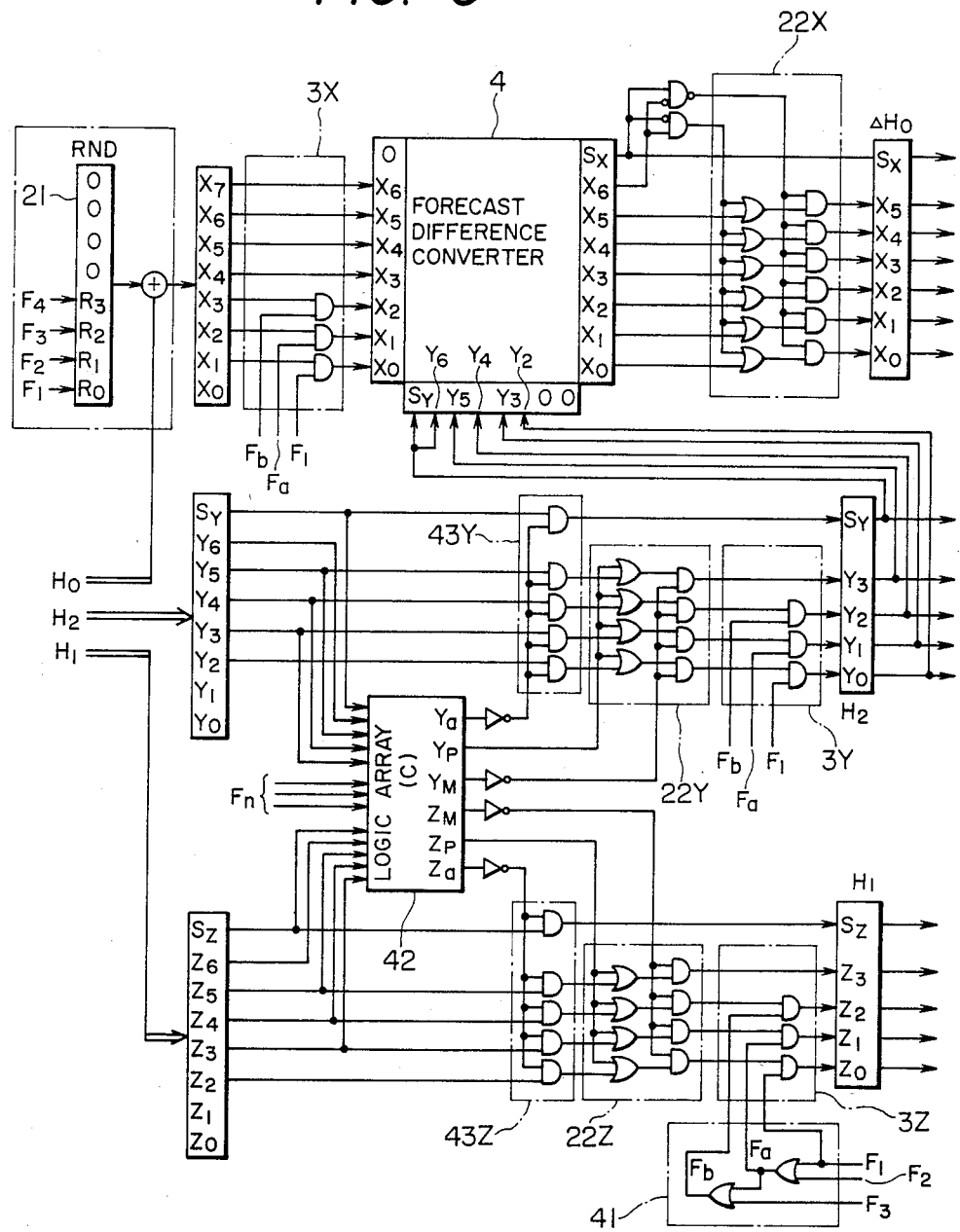
FIG. 6 is a diagram of a particular circuit configuration of the quantization circuit and level limiting circuit in FIG. 5.

The respective sequences obtained through Hadamard transformation are quantized by the quantization circuit 3 in accordance with the quantization level. For example, if the quantization characteristic number (Z.F.No.) now being used in the present block line is 2, then the Z.F. filter levels are 1, 2 and 2 for the sequences $H_0$, $H_1$, and $H_2$ respectively as shown in FIG. 4 and the quantization is made such that zeros are inserted as allowable distortion into 1 bit, 2 bits and 2 bits at the lower bit side of the respective sequences $H_0$, $H_1$ and $H_2$. The state of quantization of the respective sequences is shown in FIG. 6. The thus quantized DC component $H_0$ is linearly predicted by the forecast difference converter 4 in accordance with Equation (2) so as to obtain the DC prediction error component $\Delta H_0$. Alternatively, the DC prediction error component $\Delta H_0$ can be obtained from the procedure of FIG. 17. In FIG. 5, $Z^{-1}$ represents a delay element for one block used for obtaining the previous DC component $H_0$, and the previous horizontal component $H_2'$ in Equation (2). The initial values for the block line 64 and 0 are inserted into the $Z^{-1}$ associated with $H_0$ and $H_2$, respectively. The quantized sequences $\Delta H_0$, $H_1$, $H_2$ are then subjected to upper limit value restriction by a level limiter circuit 22 in accordance with the number of the bits allotted to the respective sequences. For example, when the number of the bits allotted to the DC prediction error component $\Delta H_0$ is seven, the level is limited to a value within a range from $-64$ to $+63$. If $\Delta H_0 = 68$, it is limited to $-64$, while if $\Delta H_0 = 65$, it is limited to 63.

Thus, the picture elements ($u_1$, $u_2$, $u_3$, $u_4$) of the block $B_{ij}$ are converted through Hadamard transformation into the spatial frequency domain, supplied with a predetermined amount of allowable distortion in accordance with the determined picture quality, and then derived as the sequences $\Delta H_0$, $H_1$ and $H_2$ to be transmitted.

Figure 7:
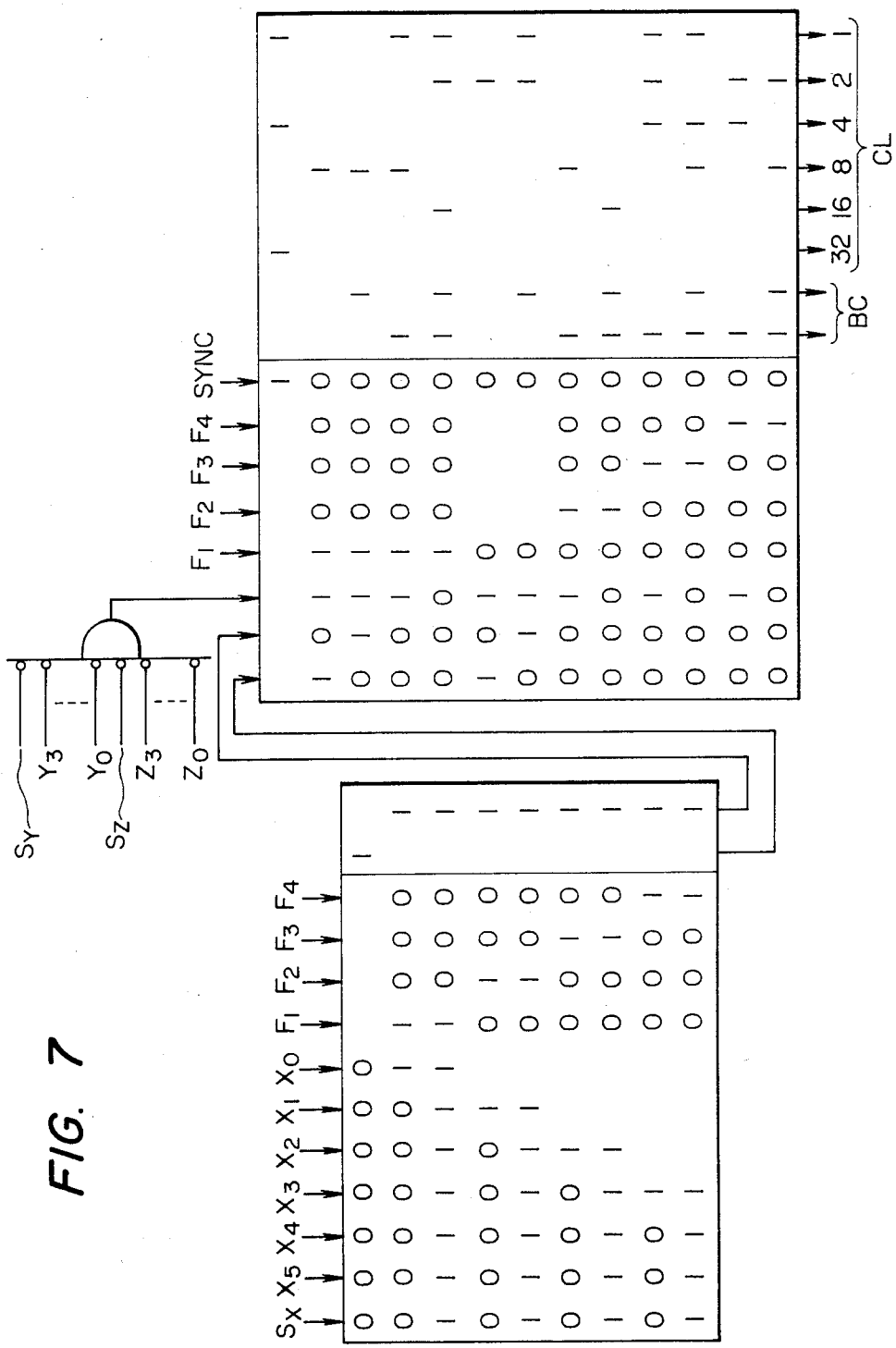
FIG. 7 is a diagram of the logical configuration of the logic array (A) of FIG. 5.

The thus obtained sequences $\Delta H_0$, $H_1$, and $H_2$ are variable length coded in the following manner. In accordance with the code format of the quantization characteristic number 1, (Z.F. No.1), the DC prediction error component $\Delta H_0$ and all the sequences $\Delta H_0$, $H_1$, $H_2$ are inputted in parallel into a shift register 23 and another longer shift register 24 in the order $(S_z X_5 X_4 X_3 X_2 X_1 X_0)$ and in the order $(S_x X_5 X_4 X_3 S_y Y_3 S_z Z_3 X_2 Y_2 Z_2 X_1 Y_1 Z_1 X_0 Y_0 Z_0)$, respectively. At the same time, these sequences $\Delta H_0$, $H_1$, $H_2$, the filter signals $F_1$ to $F_4$ being used in the present block line, and the synchronizing signal SYNC are inputted into a logic array 25 which produces the block code "BC" and the code length "CL" as shown in FIG. 4. The logic array 25 may be implemented as a logic structure shown in FIG. 7. The block code BC and the code length CL are inputted in parallel into a counter 26 and a shift register 27.

The shift registers 23, 24 and 27 are of the parallel-in/serial-out type. If the circuit is arranged so that the block code BC is inputted into the shift registers 23 and 24, the shift register 27 becomes unnecessary. The filter signals $F_1$, $F_2$, $F_3$ and $F_4$ are the flags for the quantization characteristic number (Z.F.No.) and $F_1 = 1$, $F_2 = 1$, $F_3 = 1$, $F_4 = 1$ mean Z.F.No. = 1, Z.F.No. = 2, Z.F.No. = 3, Z.F.No. = 4, respectively. As described above, these filter signals $F_1$–$F_4$ provide the quantization level selected for the next block line in accordance with the unused space of the buffer memory 6 at the time when the coding for the present block line has been completed. The details of this selection will be described later.

When the code length CL has been inputted into the counter 26, the counter 26 sets the signal P to "1" and begins to count down in accordance with a clock pulse CP, the signal P being reset when the counter 26 becomes zero. Accordingly, each of the shift registers 23, 24 and 27 and another shift register 28 perform its shift operation one bit at a time when it is driven by the clock pulse CP but only when the signal P is in the state "1". The shift register 28 is of the parallel-in/serial-out type. A synchronizing signal pattern SPTN (32 bits in the present embodiment) and the filter signals $F_1$ to $F_4$ and $F_5$ for that block line have been necessarily parallel inputted into the shift register 28 prior to the initiation of coding of one block line. The shift register 28 performs its shift operation in accordance with the clock pulse CP when the synchronizing signal SYNC for the one block line is "1" and continues shifting until the code length for the synchronizing pattern stored in the counter 26 becomes zero. When the counter 26 becomes zero, the synchronizing signal SYNC is reset to "0". There is little possibility of occurrence of the filter signal $F_5$ which is however provided for the possible case of an overflow of the buffer memory 8, in which case all the codes for the next block line are prevented from being sent and the reproduced picture image of the present block line is replaced at the reproducing side by the previously reproduced picture image of the previous block line. Thus, the filter signal $F_5$ is usually unnecessary.

The output signals produced from the shift registers 23, 24, 27 and 28 are then inputted into a shift register 31 according to the following procedure. The shift register 24 is connected to the shift register 27 through a group of gate circuits 29 only when the block code BC is (1 1), while in the other case the shift register 24 is connected to the shift register 27 through the same gate circuit group 29. Thus, the output signal of either one of the shift registers 23 and 24 is inputted into the shift register 27. (It is noted that the shift register 27 may be made unnecessary as described above.) Only when the synchronizing signal SYNC as well as the filter signal $F_5$ are zero, is the output signal of the shift register 27 inputted into the shift register 31 through a gate circuit group 30. Also only when the synchronizing signal SYNC is "1", is the output signal of the shift register 28 inputted into the same shift register 31 through the gate circuit group 30. Thus, with the clock pulse CP as a drive source, the output signals shifted out from the shift registers 23 and 27, from the shift registers 24 and 27, or from the shift register 28 are inputted into the shift register 31.

The signals successively inputted into the shift register 31 are transferred, for example, 8 bits at a time to the buffer memory 6 and every occurrence of this signal transfer causes a counter 32 to count up.

Asynchronously with the group of codes inputted into the buffer memory 6 from the shift register 31, a group of codes are outputted, for example, 8 bits at a time from the buffer memory 6. Every time these 8 bits are outputted, the counter 32 counts down.

The code group is outputted from the buffer memory 6 upon the reception of a read signal BM READ issued in accordance with a predetermined output bit rate under the condition that a flag 35, which is described later, is in its "1" state.

Figures 8, 9:
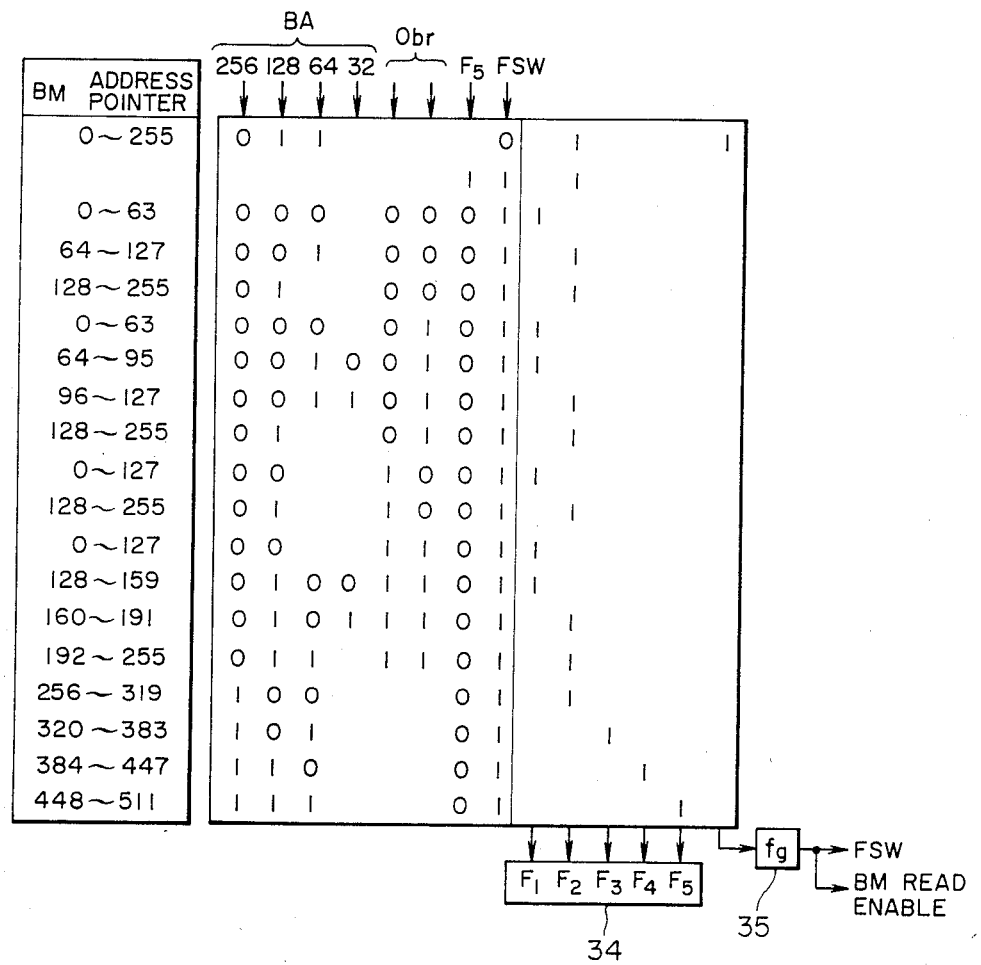
FIG. 8 is a diagram of the logical configuration of the quantization level selector of FIG. 3, or of the logic array (B) of FIG. 5.
FIG. 9 is an example of code defining the output bit rate from the buffer memory.

As described above, a logic array 33 judges in which range of the address pointer $L_n$ lies the boundary of the unused space of the buffer memory 6 as counted by the counter 32 so as to select the quantization characteristic (filter signals $F_1$ to $F_5$) for the next block line. Based on this selection, it produces the filter signals $F_1$-$F_5$ by the logic structure as shown in FIG. 8. That is, the address pointer BA of the buffer memory 6 is successively inputted into the logic array 33 from the counter 32. The output signal FSW of the flag 35 and a code obr representing the output bit rate from the buffer memory 6 are continuously inputted into the same logic array 33. The flag 35 is constituted by a flip-flop circuit and the initial value is set to zero. As shown in FIG. 8, the logic array 33 is such that the flag 35 is set to "1" only when $L_1 = P_1$ for the above-mentioned address pointer, that is, when the address pointer has first reached 256 in the present example, and thereafter the buffer memory 6 is enabled to produce its output at a predetermined bit rate.

When the filter signal $F_5$ is "1", the logic array 33 produces an output to set the filter signal $F_2$ to "1" to restore the quantization level for the next block line to a standard one.

Usually, the logic array 33 produces an output such that one of the filter signals $F_1$-$F_5$, determined depending on which region the address pointer BA is now indicating, is set to "1".

The outputted filter signals $F_1$-$F_5$ are stored in a buffer register 34 only when the register receives the synchronizing signal SYNC. That is, the filter signals $F_1$-$F_5$ for the next block line are set in the buffer register 34 in accordance with the address pointer BA from the counter 32 upon the completion of the present block line. Alternatively, of course, the logic array 33 may be arranged to operate only upon the completion of one block line.

As described above, the respective sequences subjected to Hadamard transformation are variable-length coded in accordance with the combination state of the coding and the variable length code is stored in the small capacity buffer memory 6. The variable length code is then read out from the buffer memory 6 at a predetermined bit rate asynchronously with the input bit rate with which the variable length code is inputted into the buffer memory at its coding bit rate. The variable length is then transferred onto a transmission line or into the error correction encoder 7 as shown in FIG. 3.

The output bit rate from the buffer memory 6 may be arbitrarily set in accordance with the transmission line as shown in FIG. 9 and the desired output bit rate can be attained only by applying the code obr of the set output bit rate to the logic array 33. This means that the compressibility of picture image can be arbitrarily selected in accordance with the designed picture quality. This is one of the advantages of the present invention.

FIG. 6 shows a particular example of the quantizing and level limiting circuits for the respective sequences $\Delta H_0$, $H_1$ and $H_2$ in the picture image compression device of FIG. 5 as described above.

In FIG. 6, 3X, 3Y and 3Z designate an example of quantizing circuits for the respective sequences $\Delta H_0$, $H_2$ and $H_1$ and 22X, 22Y and 22Z designate an example of level limiting circuits for the respective sequences $\Delta H_0$, $H_2$ $H_1$.

As shown in FIG. 6, a quantizer control circuit 41 is comprised of OR circuits and, for example, when the filter signal $F_2$ is "1", each of the signals $F_a$ and $F_b$ becomes "1" so that all the bits but the lowermost one of each of the respective sequences $\Delta H_0$, $H_2$ and $H_1$ are passed through the quantizing circuits 3X, 3Y and 3Z. That is, the quantization is performed by inserting "0" into only the lowermost bit or bits of each of the respective sequences $\Delta H_0$, $H_2$ and $H_1$.

Figure 10:
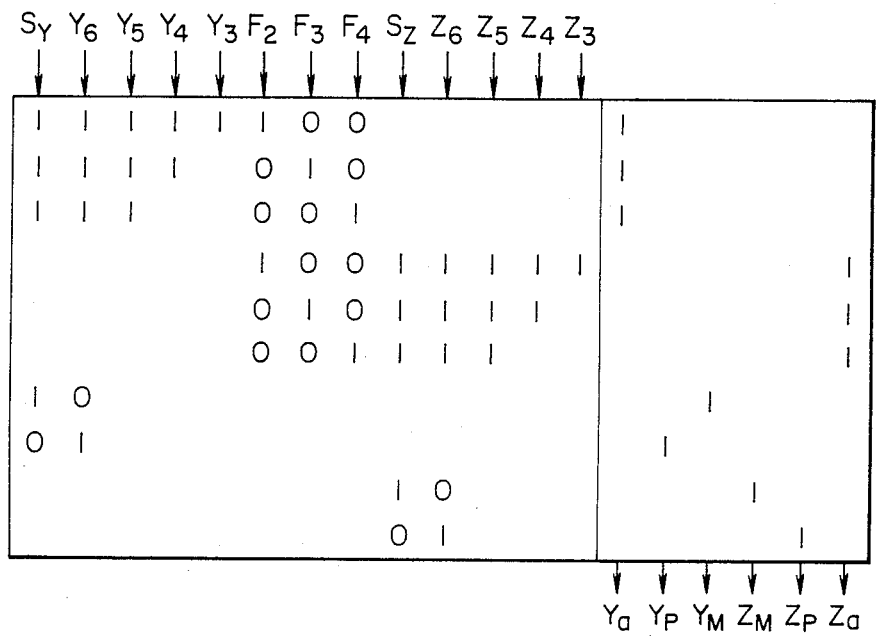
FIG. 10 is a diagram of the logical configuration of the logic array (C) of FIG. 6.

A logic array 42 is constituted by a circuit having a logic structure as shown in FIG. 10. The sequences $H_2$, $H_1$ and the filter signals $F_2$, $F_3$, $F_4$ are inputted to the logic array 42 from which signals $Y_a$, $Y_p$, $Y_h$, $Z_m$, $Z_p$, and $Z_a$ are outputted. Conditional quantizing circuits 43Y and 43Z zero the sequence $H_2$ or $H_1$ when the respective sequence $H_2$ or $H_1$ has a negative value thus satisfying the condition of FIG. 10 that makes the signal $Y_a$ or $Z_a$ "1". For example, if the filter signal $F_2$ is "1" and if the sequence $H_2$ obtained by Hadamard transformation is within a range from $-1$ to $-8$, and the value of the sequence $H_2$ is zeroed.

The level limiting circuits work in the following example of FIG. 10. If the value of sequence $H_2$ is positive and the bit position $Y_6 = 1$, then the value of the sequence $H_2$ exceeds the level limit value ($-64$ to 63) so that the signal $Y_p$ becomes "1" and all the bit positions $Y_5$-$Y_2$ of the sequence $H_2$ are set to "1", that is to 63, in the level limiter 22Y of FIG. 6.

As described above, the whole of the quantizing and level limiting circuits for the respective sequences of FIG. 6 can be constituted by AND and OR circuits.

Further, the bit arrangement, when the sequences $WH_0$, $H_1$ and $H_2$ are parallel transferred to the shift registers 23 and 24, is constituted in such a manner as shown in FIG. 11. This bit arrangement is aimed at facilitating the decoding performed in the picture image reproducing device as described later.

Figure 14:
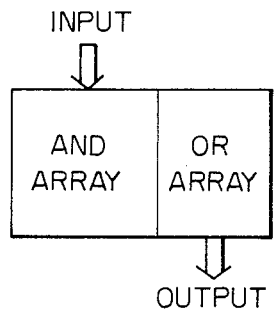
FIG. 14 is a diagram for explaining the logical configuration of FIGS. 7, 8, 10 and 13.
Figure 13:
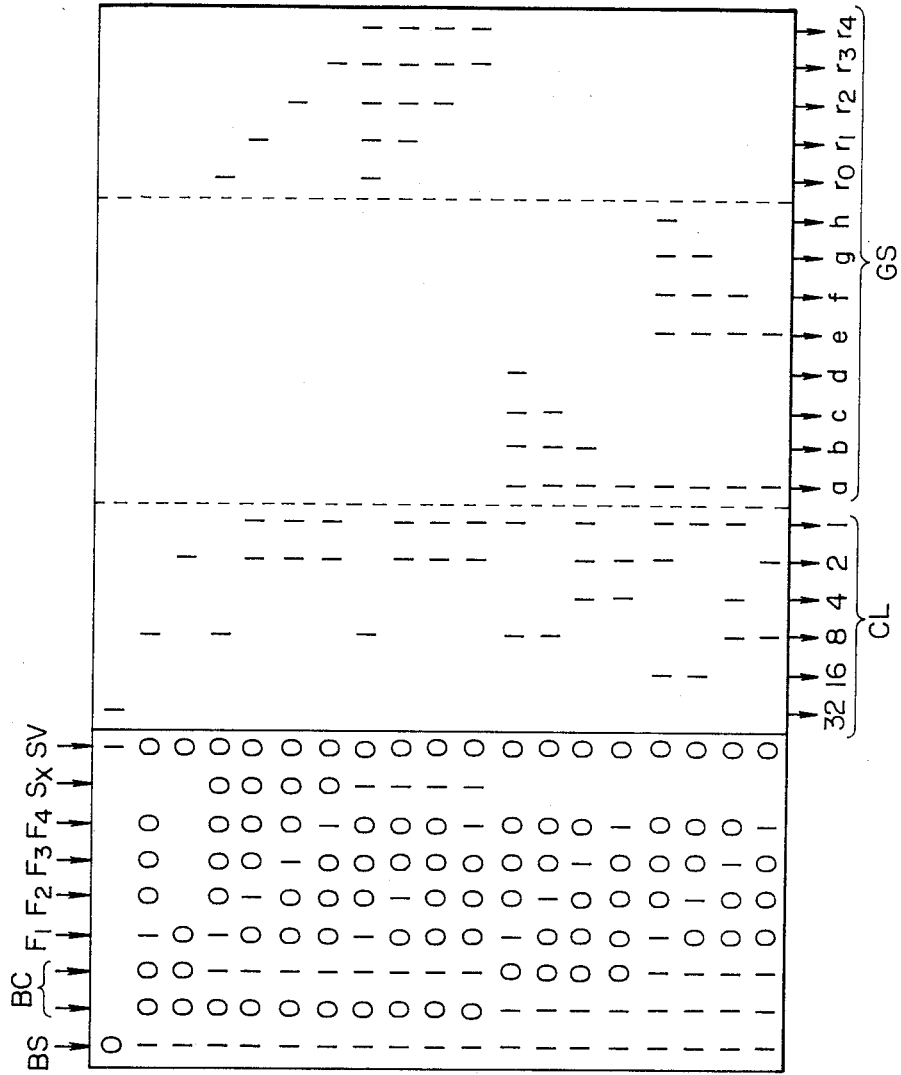
FIG. 13 is a diagram of the logical configuration of the logic array of FIG. 12.

The logic arrays 25, 33 and 42, as described above and separately shown in FIGS. 7, 8, 10, and another logic array 62, that has the logic structure shown in FIG. 13, are constituted by an AND gate array at the input side and an OR gate array at the output side as shown schematically in FIG. 14. Such an array may be easily realized by, for example, a programmable logic array (PLA).

In the present embodiment, the description is made with respect to the case where the input-to and output-from the buffer memory is performed in real time. In this case, it is required that the buffer memory 6 have a sufficient capacity to absorb the variations in compressibility. It has been confirmed that a capacity of bytes equal in number to the picture elements of one block line of an original picture image is sufficient when the average output bit rate is 0.5 to 3.0 bits/picture-element. In this embodiment the capacity of the buffer memory 6 is selected to be 512 bytes.

The case, where variable length codes are outputted at a predetermined bit rate from the buffer memory 6 to be transferred onto a transmission line after the variable length codes of an entire frame of a picture image have been inputted into the buffer memory 6, can be realized in the same approach as the above-mentioned case. In this case, a buffer memory will suffice having a capacity necessary for one frame in agreement with the output bit rate from the buffer memory 6, for example a capacity of 1.5×(number of picture elements of one frame)

when the output bit rate is 1.5 bits/picture-element on the average. Then the quantization level for the next block line is selected on the assumption that the variable length codes are outputted at the above-mentioned output bit rate from the buffer memory 6 by the signals for one block line.

The respective sequences $\Delta H_0$, $H_1$ and $H_2$ are variable-length coded by the picture image compression device as described above are inputted into the picture image reproducing device through a transmission line. The operation of the reproducing device will be described with respect to a particular embodiment of its circuit.

FIG. 12 shows a particular embodiment of the picture image reproducing device illustrated in FIG. 3(b). In FIG. 12, a picture image signal obtained through picture image compression and variable length coding is inputted into a shift register 51 one bit at a time through a transmission line such as a magnetic recording system. The output signal of the shift register 51 is inputted into a shift register 52 one bit at a time. Similarly to this, the output signal of the shift register 52 is inputted into a shift register 53, the output of which is in turn inputted into a shift register 54. Each of these shift registers 51, 52, 53 and 54 is of the serial-in/parallel-out type but also with a serial-out output. Each of flags 56 and 59 constituted by a flip-flop is initially in its reset state. A synchronizing signal is detected by a synchronizing signal detecting circuit 55 for a signal group parallel derived from the shift register 53 every time an input signal IN is inputted by one bit into the shift register 51. The detection of the synchronizing signal is performed in such a manner that a synchronizing signal is assumed to exist. For example, all the 17 data bits of the shift register 53 may be "1" or a data group may agree with a predetermined synchronizing signal pattern in at least one portion of the 17 data bits. Regardless of which detection method is used, since the input signal IN is continuously inputted into the shift register 53, it is required to design the circuit such that the detection pattern of the synchronizing signal can be clearly distinguished from the picture image signal group. Even if a case may occur accidentially due to an error on the transmission line or the like in which a signal group coincides with the synchronizing signal pattern, the probablity of such an accidental case is very small. Upon the detection of a synchronizing signal, the signal SYNC sets the flag 56, but resets the flag 59. When the flag 56 is in its set state, the contents of the shift register 52 is held in a buffer register 57 by a shift pulse SP in synchronism with the one bit input signal IN and a specific pattern following a synchronizing signal is detected by a pattern detecting circuit 58. For example, when the flag 56 is in its set state, the case where the data pattern of the shift register 52 is "00110101", is detected. The buffer register 57 may be constituted by a group of AND gates.

Upon the detection of a specific pattern in this manner, a signal SV resets the flag 56, but sets the flag 59. Further, the five data bits of the shift register 51, which are the above-mentioned filter signals $F_1$-$F_5$ to be used for determining the quantization level for the next input picture image signal group, are held in a buffer register 60 by the signal SV. In this case, when the filter signal $F_5$ is "1", no picture image signal for the next block line is fed and the flag 59 is immediately reset so as to be put into its standby state awaiting the detection of the next synchronizing signal.

When the flag 59 is in its set state, the 17 bits of data of the shift register 53 are considered to be a picture image signal and are decoded. However, at the time the signal SV has been issued, the synchronizing signal pattern is still left in the shift register 53 and the signal SV is inputted into the logic array 62 to be described later and derived therefrom as a signal CL. The signal CL, a value 32 in this example, derived from the logic array 62 is inputted into a counter 64 which begins to count down in synchronism with the input signal IN. Thus, when the contents of the counter 64 becomes zero, the block code BC as shown in FIG. 4 has been stored in the shift register 54.

Although the description has been made for an example of the synchronizing signal pattern SPTN of 32 bits in the picture image compression device of FIG. 5, only 25 bits in all, that is 17 bits for the synchronizing signal detecting circuit 55 and 8 bits for the pattern detecting circuit 58, are used for the detection in the reproducing device of FIG. 12. This is to moderate the influence of a pattern error on the transmission line when such an error is generated and to make it possible to detect the synchronizing signal pattern with a high probability even in the case where an error occurs within 7 bits of the 32 bits of the synchronizing signal SPTN. If the detection of the synchronizing signal becomes impossible, the decoding of the picture image is thereafter halted which excessively deteriorates the picture quality. Accordingly, it is required to improve the reliability of the synchronizing signal by providing sufficient redundancy in view of the reliability of the transmission line by providing sufficient error correction or the like.

When the block code BC has been inputted into the shift register 54, the contents of the counter 64 is zero and therefore the 2-bit block code BC in the shift register 54 and the 1-bit data $S_x$ at the uppermost position of the shift register 53 are held in a buffer register 61 by the signal BS output at this time from the counter 64. When the block code BC in the shift register 54 is "00", the data $S_x$ at the uppermost position of the shift register 53 is the forward end bit of the next block code, while, when the block code BC is a value other than "00", the data $S_x$ designates the positive or negative sign of the DC error component $\Delta H_0$ as shown in FIG. 4.

Figure 15:
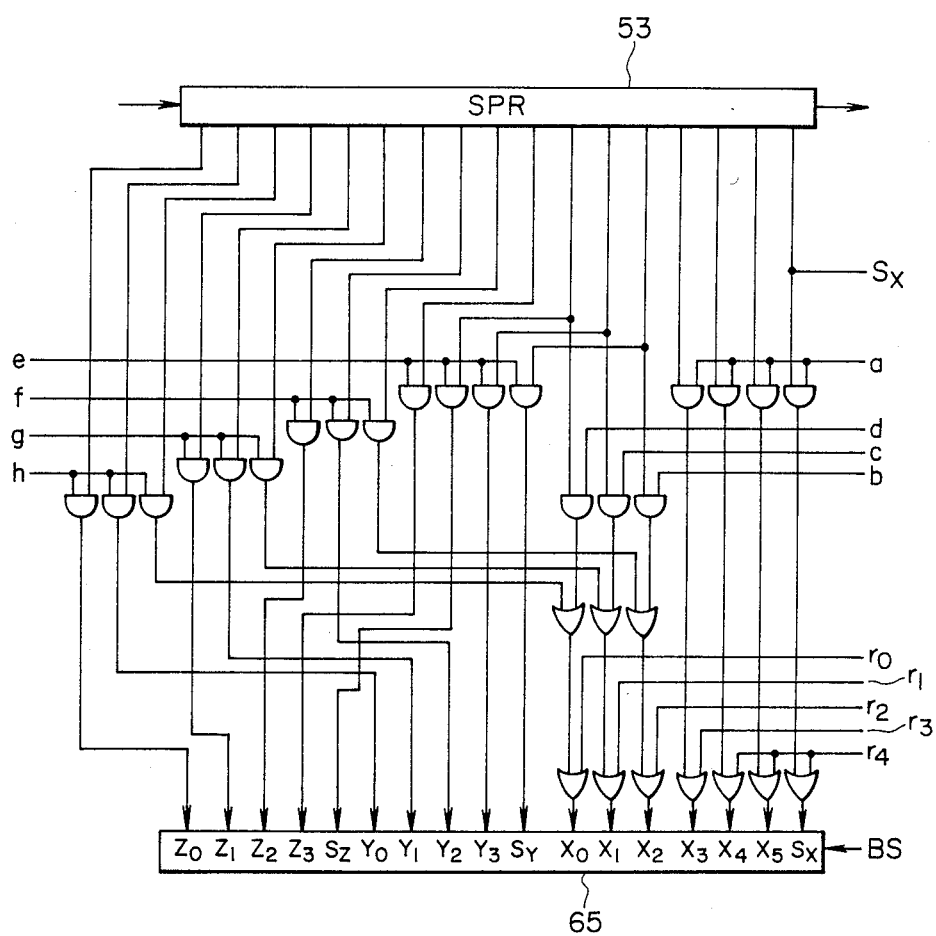
FIG. 15 is a particular circuit diagram of the gate array of FIG. 12.

The contents of the buffer register 61 are immediately inputted into the logic array 62 from which a gate signal GS and a code length signal CL of variable length code are in turn outputted. The logic array 62 has a logic structure as shown in FIG. 13 and produces filter signals $F_1$-$F_4$, the block code BC and the following signal $S_x$. It also produces the gate signal GS and the code length signal CL depending on the state of the block signal BS when the counter 64 counts to zero. When the block code BC is "00", all the signals (a–h, $r_0$–$r_4$) of the gate signal GS are zero and therefore a value zero is held in a buffer register 65. But when the block code BC is "01", the "+1" or "−1" of the DC prediction error component is held depending on the state of the signals $r_0$–$r_4$ in the gate signal GS. In this manner, the respective sequences $\Delta H_0$, $H_1$ and $H_2$ are held in the buffer register 65 by the gate signal GS (a–h, $r_0$–$r_4$) in the format shown in FIG. 15.

The contents of the buffer register 65, that is the respective sequences $\Delta H_0$, $H_1$ and $H_2$, are stored in a predetermined address in a buffer memory 66 by a read signal WT which is issued when the output signal DE of the flag 59 is in its set state but after a predetermined delay set by the block signal BS. The address signal for inputting data into the buffer memory 66 is generated by a horizontal address counter (block counter) 67 and a vertical address counter (block line counter) 68.

When the code length signal CL outputted from the logic array 62 is inputted into the counter 64 similarly to the above-mentioned case, the counter 64 begins to count down in synchronism with the input signal IN and outputs a block signal BS when its contents becomes zero. At this time, the next block code has been inputted in the signal register 64.

Repeating the operation as described above, the respective sequences $\Delta H_0$, $H_1$ and $H_2$ are decoded block by block and successively inputted into the buffer memory 66.

Assume now by way of example that the signal group transferred from the picture image compressing device of FIG. 3(a) are inputted one bit at a time in the order of " . . . 'SYNC' 00110101' 01000' 011' 00' 1100101100011101' 10001011' . . . ".

Description will be made from the time a synchronizing signal has been detected in these signal groups. Upon the detection of the data pattern "00110101" by the pattern detecting circuit 58 after the detection of the synchronizing signal, the filter signal "01000" stored in the shift register 51 at this time is held in a buffer register 60 by the signal SV. This means that the filter signal $F_2=1$ (the quantization number, Z.F. No., in FIG. 4 is 2) is used for this block line. A value 32 is outputted as the code length signal from the logic array 62 by the signal SV. When the counter 64 counts down to zero, the block code "01" exists at this time in the shift register 54 and therefore the gate signal GS ($r_1$-$r_4$="1") and the code length signal CL=3 are produced from the logic array 62 in response to the inputting of BC="01", $S_x$="1", BS="1", and $F_2$="1". The contents "1111110,00000,00000" of the shift register 53 at this time are inputted into the buffer register 65 through a gate array 63 based on the arrangement of FIG. 15. That is, the respective sequences $\Delta H_0=-2$, $H_1=H_2=0$ are reproduced.

When the code length signal CL=3 is inputted into the counter 64 and the counter 64 counts down to zero to produce the block signal BS, the next block code "00" is in the shift register 54 and therefore the gate signal GS (all "0") and the code length signal CL=2 are outputted from the logic array 62 under the conditions BC="00", BS="1" and $F_2$="1". At this time, the contents of the shift register 53 do not pass through the gate array 63 and therefore all the contents of the buffer register 65 are "0" so that the sequences $\Delta H_0=H_1=H_2=0$ are reproduced. Next, if the contents of each of the shift registers 51 to 54 shift by two bits (CL=2), the next block code "11" is in the shift register 54 at this time and therefore the gate signal GS (a=e=f=g="1") and the code length signal CL=17 are obtained by the signals BC="11", BS"1" and F="1". At this time, the contents of the shift register 53 are inputted as "0010010, 11100,00110" into the buffer register 65 in response to the gate signals a=e=f=g="1" so that the sequences $\Delta H_0=18$, $H_1=-4$ and $H_2=6$ are reproduced. The contents of each of the shift registers 51 to 54 further shift by 17 bits (CL=17), the next block code "10" is in the shift register 54 at this time and therefore the gate signal GS (a=b=c="1") and the code length signal CL=8 are obtained by the signals BS="10", BS="1" and $F_2$="1". At this time the contents of the shift register 53 are inputted as "0010110,00000,00000" into the buffer register 65 so that the sequences $\Delta H_0=22$, $H_1=H_2=0$ are reproduced.

The repetition of the above-mentioned operation is performed in synchronism with the input signal IN and the reproduced sequences $\Delta H_0$, $H_1$ and $H_2$ are stored block by block in the buffer memory 66. At this time, the input address to the buffer memory 66 is controlled by the horizontal address counter (block counter) 67 and the vertical address counter (block line counter) 68. The contents of the horizontal address counter 67 is incremented by one block in response to the read signal WT of the buffer memory 66 and it produces a signal SH when it has counted the block number corresponding to one block line. The generation of this signal SH indicates the completion of one block line before the detection of the synchronizing signal SYNC, caused by a change in configuration of the variable length code, which is a picture image signal, due to errors occurring on the transmission line. The flag 59 is reset at this time to prevent the inputting of the picture image signal of the existing remaining block for the present block line and to thereby wait for the detection of the next synchronizing signal. When the next synchronizing signal is detected due to a change in configuration of the variable length code for the reason as described above, that is before the completion of counting of the number of blocks for one block line, the flag 59 is reset similarly to the above-mentioned case. At this time, the contents of the buffer memory 66 for the picture image signal for one block line lacks the picture image signal of the remaining block or blocks of that block line. In either event, when a change is generated in configuration of the variable length code for the reason as described above, it is required to effect processing such as replacement of the sequences $\Delta H_0$, $H_1$ and $H_2$ of the respective blocks of the present block line stored in the buffer memory 66 by the corresponding sequences $\Delta H_0$, $H_1$ and $H_2$ of the previous block line.

The vertical address counter (block line counter) 68 increments for a block line in response to any one of the signals SV, SH and filter signal $F_5$.

The thus decoded sequences $\Delta H_0$, $H_1$ and $H_2$ of the respective blocks are successively inputted into the buffer memory 66, while, simultaneously, the sequences $\Delta H_0$, $H_1$ and $H_2$ of the respective blocks are succesively read out of the buffer memory 66 in response to the read signal RD occurring asynchronously with respect to the input. Although the description is omitted here, it is of course necessary to provide address counters for the reading operation similar to the address counters 67 and 68 for the writing operation.

The DC prediction error component $\Delta H_0$, among the sequences $\Delta H_0$, $H_1$ and $H_2$ read out of the buffer memory 66, is linearly predicted to be converted into the DC component $H_0$ in the prediction sum converter 15. The prediction sum converter 15 is built based on the equation $H_0=\Delta H_0+H_0$, $-H_2-H_2$, derived from Equation (2) in order to reproduce the DC component $H_0$. From the thus decoded sequences $H_0$, $H_1$ and $H_2$, reproduced picture element groups ($u_1'$, $u_2'$, $u_3'$, $u_4'$) are obtained by the Hadamard reverse-transformer 16.

The Hadamard reverse-transformer 16 is built in accordance with the following equation (8).

$$\frac{1}{2}\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} H_0' \\ H_1' \\ H_2' \\ 0 \end{pmatrix} = \begin{pmatrix} u_1' \\ u_2' \\ u_3' \\ u_4' \end{pmatrix} \quad (8)$$

where $H_0'$, $H_1'$, $H_2'$ represent the decoded sequences which are different from the sequences $H_0$, $H_1$, $H_2$ obtained in accordance with Equation (1) because the quantization errors due to the picture image compression are included in the former. Accordingly, the reproduced picture element groups ($u_1'$, $u_2'$, $u_3'$, $u_4'$) are different from the original picture element groups ($u_1$, $u_2$, $u_3$, $u_4$) in the same block by the amount of quantization error of the sequences $H_0$, $H_1$ and $H_2$. Of course any error generated on the transmission line will produce further differences. At this time, the average value of noise carried in one frame can be expressed by Equation (7). This relationship may be expressed by Equation (9) in vector form as follows:

$$V = H \cdot U \text{ or } U = H^{-1} \cdot V \quad (9)$$

where U represents the vector of the original picture element groups in one block, H the Hadamard transformation matrix, V the Hadamard-transformed sequences and $H^{-1}$ the Hadamard reverse-transformation matrix.

If the quantization error $q_{ij}$ is given to the respective sequences $v_{ij}$, that is if the distortion amount Q in vector form is given to the vector V, the reproduced picture image is expressed by the following Equations (10) and (11):

$$U' = H^{-1} \cdot (V+Q) = H^{-1} \cdot Q = U + H^{-1} Q \quad (10)$$

$$U' - U = H^{-1} \cdot Q \quad (11)$$

Thus, the noise carried on the reproduced picture image assumes a Hadamard reverse-transformed value of the distortion value $q_{ij}$, so that for example the distorton value $q_0$ given to the DC component $H_0$ causes deterioration over the whole block and the distortion value $Q_3$ given to the gradient component $H_3$ causes deterioration in oblique patterns in the block.

As described above, according to the present invention, the compression as well as reproduction of a color picture image can be realized by the same arrangements as those described above.

For example, the compression and reproduction of a color picture image can be realized by suitably arranging, as a mere example of picture elements arrangement of color picture image, a luminance signal Y, a color difference signal (B-Y, R-Y), or a blue color signal B, a red color signal R, a green color signal G, an orange/cyanic system color signal I, green/magenta system color signal Q, or the like, correspondingly to the picture image elements ($u_1$, $u_2$, $u_3$, $u_4$) as shown in FIG. 1.

As shown in FIG. 5, the gradient component $H_3$ has been disregarded for the reasons described above for a black-and-white picture image. However, the gradient component $H_3$ cannot be disregarded in such an arrangement as described for a color picture image. Accordingly, it is necessary to change the construction of the variable length code shown in FIG. 4 into that as shown, by way of example, in FIG. 16. In FIG. 16, $S_w$, $w_3$, $w_2$, $w_1$, $w_0$ represent the bit information for the gradient component $H_3$. In this example, the gradient $H_3$ may be subjected to the compressing and reproducing processes in the same manner as those for the vertical and horizontal components $H_1$ and $H_2$ and therefore no particular description about it is necessary here. The construction of variable length code as shown in FIG. 16 is of course applicable to color images as it is to black-and-white images.

Figure 17:
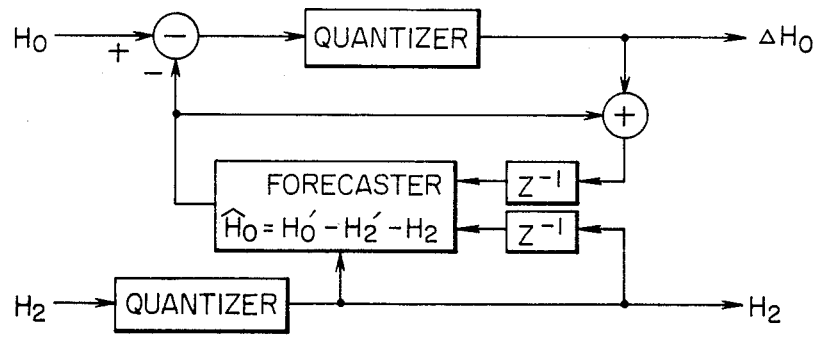
FIG. 17 is a diagram illustrating another embodiment for obtaining the quantized value of the DC prediction error component.

The quantized value $\Delta H_0$ of the prediction error component calculated in the FIG. 5 embodiment may be alternatively calculated by the arrangement as shown in FIG. 17. FIG. 17 shows a system of DPCM which is well known generally as a linear prediction system. The main difference in construction between the respective embodiments of FIGS. 5 and 17 is that the DC prediction error component $\Delta H_0$ is quantized in the embodiment of FIG. 17, while in the embodiment of FIG. 5 the DC component $H_0$ is quantized and thereafter the DC prediction error component $\Delta H_0$ is calculated.

In the quantizer of FIG. 17, non-linear quantization is performed so as to generally minimize visual deterioration in picture quality by using the characteristic that the prediction error component has a form approximating a Laplacian distribution. However, the dispersion of the prediction error component is large in a complicated picture image and if non-linear quantization is applied to such a complicated picture image as it is applied to a smooth picture image, the picture quality is greatly deteriorated. This non-linear quantization can be easily realized by using a look-up table. On the other hand, the linear quantization can be realized more easily only by uniformly omitting the lower bit of the prediction error component as described in the previous embodiment, and when the compressibility is constant, visual difference in picture quality can be hardly recognized between the two. Therefore although the description has been made above so as to use the linear quantization in the embodiment, the present invention is not limited to this.

Since it is assumed that when linear prediction is performed, the prediction error component generally approximates the Laplacian distribution, then also the entropy is small. In this case, if comparision is made between the distribution of the DC prediction error component $WH_0$ calculated in accordance with FIG. 5 and that calculated in accordance with FIG. 17, the distribution in the latter centers more markedly around zero than in the former and therefore it seems the latter is superior to the former in compressibility. However, in the case where the compressibility is made constant in accordance with the present invention, there is little difference in the amount of noise between the two and therefore either of the two may be freely used. When the former is used, however, it is necessary to cause the DC component $H_0$ to be subjected to a rounding operation.

As described above for an embodiment of the invention of a device for realizing the picture image compressing system and its associated reproducing device, the present invention has an advantageous feature. Since variable length coding is performed for the combination of the respective sequences obtained by Hadamard transformation of original picture element groups, it is possible to perform coding with high efficiency without increasing distortion given to the respective sequences and therefore deterioration in reproduced picture image is small considering the high compressibility. Further, control is made such that the variations in compressibility due to the variable length coding (that is, the difference in time base between the coding bit rate and the coded signal transferring bit rate) can be absorbed by a small capacity buffer memory. This provides a highly efficient compressing system adaptive to the visual requirements. Furthermore, the present invention has a feature that the compressibility of picture image can be selected at choice and it is only necessary to designate the output bit rate from the buffer memory. This determines the transfer bit rate onto the transmission line and the amount of information to be transferred. Also, in view of the practical use of the apparatus, the present invention has various features for a high compressibility with little deterioration in picture quality in spite of the use of Hadamard transformation of minimum block size and for processing the compression and reproduction which may be built with simple logic circuits so that the apparatus can be easily realized.

I claim:

1. An adaptive picture image compression system, comprising:
   a Hadamard transformer for converting to the spatial frequency domain picture elements formed from a block of neighboring elements of a picture image, thereby producing a sequence of components;
   a quantizer for quantizing said components of said sequence according to at least one quantization level;
   a quantization characteristic selector for selecting said quantization level;
   a difference predictor for predicting a quantized DC error of a DC component of said quantized components of said sequence; and
   an encoder for converting said quantized components and said predicted quantized DC error of said sequence into a predetermined variable length code, said length dependent upon values of said quantized components and of said quantized error of said sequence.

2. An adaptive picture image compression system, as recited in claim 1, further comprising a buffer memory (6) for receiving said variable length code at an input bit rate and for outputting at a predetermined output bit rate asynchronously with said input bit rate and wherein said quantization characteristic selector selects said quantization level based on the remaining amount of variable length code in said buffer memory after said buffer memory has received said variable length code for a predetermined plural number of blocks.

3. An adaptive picture image compression system, as recited in claim 1, further comprising an address counter (10) for adding, every time a variable length code is inputted into said buffer memory, the code length of said inputted variable length code and for subtracting, every time a variable length code is outputted from said buffer memory, the code length of said outputted variable length code, and in which there are provided address pointers ($L_1, L_2, \ldots, L_p$) dividing said buffer memory into a plurality of address spaces wherein at the time after the variable length codes in a predetermined number of blocks have been inputted into said buffer memory, said quantization characteristic selector receives the output of said counter, determines in which of said address divisions of said buffer memory the remaining amount of said inputted variable length codes exist and thereby selects the quantization level to be used for quantizing the respective sequences in the next predetermined numbers of blocks.

4. An adaptive picture image compression system, as recited in claim 2, further comprising an address counter (10) for adding, every time a variable length code is inputted into said buffer memory, the code length of said inputted variable length code and for subtracting, every time a variable length code is outputted from said buffer memory, the code length of said outputted variable length code, and in which there are provided address pointers ($L_1, L_2, \ldots, L_p$) dividing said buffer memory into a plurality of address spaces wherein at the time after the variable length codes in a predetermined number of blocks have been inputted into said buffer memory, said quantization characteristic selector receives the output of said counter, determines in which of said address divisions of said buffer memory the remaining amount of said inputted variable length codes exist and thereby selects the quantization level to be used for quantizing the respective sequences in the next predetermined numbers of blocks.

5. An adaptive picture image compression system, as recited in claim 3, in which an address pointer $L_S$ is provided in the address space of said buffer memory so that said buffer memory does not output the variable length code before the amount of the variable length codes inputted into said buffer memory has reached said address pointer $L_S$.

6. An adaptive picture image compression system, as recited in claim 4, in which an address pointer $L_S$ is provided in the address space of said buffer memory so that said buffer memory does not output the variable length code before the amount of the variable length codes inputted into said buffer memory has reached said address pointer $L_S$.

7. An adaptive picture image compression system, as recited in claim 1, in which said group of $m \times n$ picture elements of each block is constituted by $2 \times 2 = 4$ picture elements, and in which said four picture elements in each block are constituted by a given arrangement of luminance and chrominance signals for adaptively compressing color picture images.

8. An adaptive picture image compression system, as recited in claim 1, in which said group of $m \times n$ picture elements of each block is constituted by $2 \times 2 = 4$ picture elements, and in which said four picture elements in each block are constituted by a given arrangement of chrominance signals for adaptively compressing color picture images.

9. An adaptive picture image compression system, as recited in claim 2, wherein said output bit rate is determined from a compressibility desired for said compression system.

10. A method for adaptively compressing a picture image, comprising the steps of:
    dividing a picture image into blocks, each consisting of $m \times n$ neighboring picture elements;
    converting the picture element group of each block into the spatial frequency domain through Hadamard transformation, thereby producing a sequence of components;
    selecting one of a plurality of quantization levels;
    quantizing said components of said sequence with said selected quantization level;
    converting at least a DC component of said quantized components into a quantized prediction component;
    comparing the quantized components and quantized prediction component of one block with each other for producing a plurality of combinations of quantized combinations; and
    applying to each of said combinations a predetermined variable length code, said length dependent upon values of said quantized combinations.

* * * * *